United States Patent
Yin et al.

(10) Patent No.: US 12,399,682 B2
(45) Date of Patent: Aug. 26, 2025

(54) DATA PROCESSING DEVICE, COMPUTER-READABLE RECORDING MEDIUM STORING DATA PROCESSING PROGRAM, AND DATA PROCESSING METHOD

(71) Applicant: Fujitsu Limited, Kawasaki (JP)

(72) Inventors: Fang Yin, Kawasaki (JP); Yasuhiro Watanabe, Kawasaki (JP); Hirotaka Tamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/755,765

(22) Filed: Jun. 27, 2024

(65) Prior Publication Data
US 2025/0036359 A1    Jan. 30, 2025

(30) Foreign Application Priority Data
Jul. 28, 2023    (JP) .................. 2023-123028

(51) Int. Cl.
*G06F 7/02*    (2006.01)

(52) U.S. Cl.
CPC ..................... *G06F 7/02* (2013.01)

(58) Field of Classification Search
CPC ........ G06F 7/02; G06F 16/2453; G06F 17/10; G06N 7/01; G06N 99/00
See application file for complete search history.

(56) References Cited

U.S. PATENT DOCUMENTS

| | | | |
|---|---|---|---|
| 2019/0286077 A1* | 9/2019 | Koyama | .................. G06N 3/08 |
| 2020/0042570 A1 | 2/2020 | Tamura | |
| 2020/0090026 A1* | 3/2020 | Shibasaki | .............. G06N 3/044 |
| 2020/0117697 A1* | 4/2020 | Miyazawa | .............. G06F 7/544 |

(Continued)

FOREIGN PATENT DOCUMENTS

| | | |
|---|---|---|
| EP | 3757908 A1 | 12/2020 |
| JP | 2020-021209 | 2/2020 |

(Continued)

OTHER PUBLICATIONS

EESR—Extended European Search Report mailed on Dec. 19, 2024 for corresponding European Patent Application No. 241856582 [5 pages]. **Reference US2022/0405048A1 cited in the EESR was previously submitted in the IDS filed on Jun. 27, 2024.

*Primary Examiner* — Francisco A Grullon
(74) *Attorney, Agent, or Firm* — Fujitsu Intellectual Property Center

(57) ABSTRACT

A data processing device including: a memory storing a plurality of values at a first time point, which include: values of state variables at the first time point and included in an evaluation function of a combinatorial optimization problem with a constraint condition; values of first local fields at the first time point and used to specify a change amount of values of the evaluation function by a change in the values of the state variables; and values of second local fields at the first time point and used to specify an amount to be added to the values of the evaluation function when the constraint condition is not satisfied; and a control circuit configured to return the plurality of state variables, the first local fields, and the second local fields to the values at the first time point when the determination circuit has determined not to accept the change.

7 Claims, 21 Drawing Sheets

(56) References Cited

U.S. PATENT DOCUMENTS

| | | | |
|---|---|---|---|
| 2020/0125047 A1 | 4/2020 | Kanda et al. | |
| 2020/0327393 A1 | 10/2020 | Yoneoka | |
| 2021/0303755 A1 | 9/2021 | Kanda | |
| 2021/0312108 A1 | 10/2021 | Matsuura | |
| 2021/0365605 A1* | 11/2021 | Handa | G06F 30/20 |
| 2022/0318663 A1 | 10/2022 | Katayama et al. | |
| 2022/0405048 A1 | 12/2022 | Konoshima et al. | |

FOREIGN PATENT DOCUMENTS

| | | |
|---|---|---|
| JP | 2020-064536 | 4/2020 |
| JP | 2020-173579 | 10/2020 |
| JP | 2021-157361 | 10/2021 |
| JP | 2021-165965 | 10/2021 |
| JP | 2022-158585 | 10/2022 |
| JP | 2023-000462 | 1/2023 |

\* cited by examiner

FIG. 4

$$\frac{\begin{array}{cccccc} h_1 & h_2 & \cdots & h_N & h_{N+1} & \cdots & h_{N+M} \\ +\Delta x_j ( W_{1j} & W_{2j} & \cdots & W_{Nj} & W_{N+1,j} & \cdots & W_{N+M,j} ) \end{array}}{\begin{array}{ccccccc} h_1 & h_2 & \cdots & h_N & h_{N+1} & \cdots & h_{N+M} \end{array}}$$

DATA PROCESSING DEVICE, COMPUTER-READABLE RECORDING MEDIUM STORING DATA PROCESSING PROGRAM, AND DATA PROCESSING METHOD

CROSS-REFERENCE TO RELATED APPLICATION

This application is based upon and claims the benefit of priority of the prior Japanese Patent Application No. 2023-123028, filed on Jul. 28, 2023, the entire contents of which are incorporated herein by reference.

FIELD

The embodiments discussed herein are related to a data processing device, a non-transitory computer-readable recording medium storing a data processing program, and a data processing method.

BACKGROUND

There is an approach of converting a combinatorial optimization problem into an Ising model that represents a spin behavior of a magnetic body at a time of searching for a solution to the combinatorial optimization problem. Then, a state of the Ising model in which a value of an Ising-type evaluation function, that is, a value corresponding to energy of the Ising model is locally minimized is searched for with the Markov-chain Monte Carlo method. The state in which the minimum value of local minimum values of the evaluation function is reached is treated as an optimal solution. The state variable included in the Ising-type evaluation function is a binary variable that takes a value of 0 or 1. The state variable may be expressed as a bit. Note that a state in which the value of the evaluation function is locally maximized can also be searched for by changing a sign of the evaluation function.

Hereinafter, the Markov-Chain Monte Carlo method will be abbreviated as an MCMC method. In addition, processing based on the MCMC method will also be sometimes referred to as MCMC processing. In the MCMC processing, for example, a state transition is accepted at an acceptance probability of the state transition defined by the Metropolis method or the Gibbs method. Exemplary types of the MCMC method include simulated annealing method and a replica exchange method.

There is a traditional process in which the number of bits for which a change (hereinafter, referred to as a transition) in a state variable is permitted in one trial of a process by the MCMC processing is assumed as one (hereinafter, referred to as a single-bit transition process). In the single-bit transition process, however, when a solution gets stuck at a local solution, it is difficult to escape from the local solution, and the search speed might drop in some cases.

Therefore, there is a suggested process for determining whether or not transitions of a plurality of bits are possible based on a result of computing a change amount of a value of the evaluation function in a case where transitions of the plurality of bits occur and causing transitions of the plurality of bits in a case where the transitions are permitted. Hereinafter, such a process will be referred to as a multiple-bit transition process. By the multiple-bit transition process, escape of a solution from a local solution is facilitated, and the search range may be expanded.

Incidentally, some combinatorial optimization problems have a constraint condition supposed to be satisfied by a solution. For example, a knapsack problem, which is one of the discrete optimization problems, has a constraint condition that a total capacity of luggage that will be packed in a knapsack is equal to or smaller than a capacity of the knapsack.

Japanese Laid-open Patent Publication No. 2020-021209, Japanese Laid-open Patent Publication No. 2020-064536, Japanese Laid-open Patent Publication No. 2021-157361, and Japanese Laid-open Patent Publication No. 2021-165965 are disclosed as related art.

SUMMARY

According to an aspect of the embodiments, there is provided a data processing device including: a memory configured to store a plurality of values at a first time point, the plurality of values including: values of a plurality of state variables at the first time point, the plurality of state variables being included in an evaluation function of a combinatorial optimization problem with a constraint condition; values of first local fields at the first time point, the first local fields being used to specify a change amount of values of the evaluation function associated with a change in each of the values of the plurality of state variables; and values of second local fields at the first time point, the second local fields being used to specify a constraint violation amount to be added to the values of the evaluation function when the constraint condition is not satisfied; a transition candidate designation circuit configured to calculate the change amount by using the values of the first local fields at the first time point, and designate candidates of which the values are to be changed, one by one from among the plurality of state variables, based on the change amount; an update circuit configured to update the values of the candidates and the values of the first local fields and the second local fields every time the candidates are designated, and further update, at a second time point, the values of the first local fields by using the values at the first time point and the values at the second time point of the second local fields; a cumulative value calculation circuit configured to calculate cumulative values of the change amount when the values of the candidates are changed; a determination circuit configured to determine whether or not to accept the change in the values of a first number of the candidates, which is equal to or greater than two, based on the cumulative values; and a control circuit configured to return each of the values of the plurality of state variables, the values of the first local fields, and the values of the second local fields to the plurality of values at the first time point when the determination circuit has determined not to accept the change in the values of the first number of the candidates.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of updating first local fields and second local fields in a case where a value of $x_j$ has changed;

DESCRIPTION OF EMBODIMENTS

Figure 1:
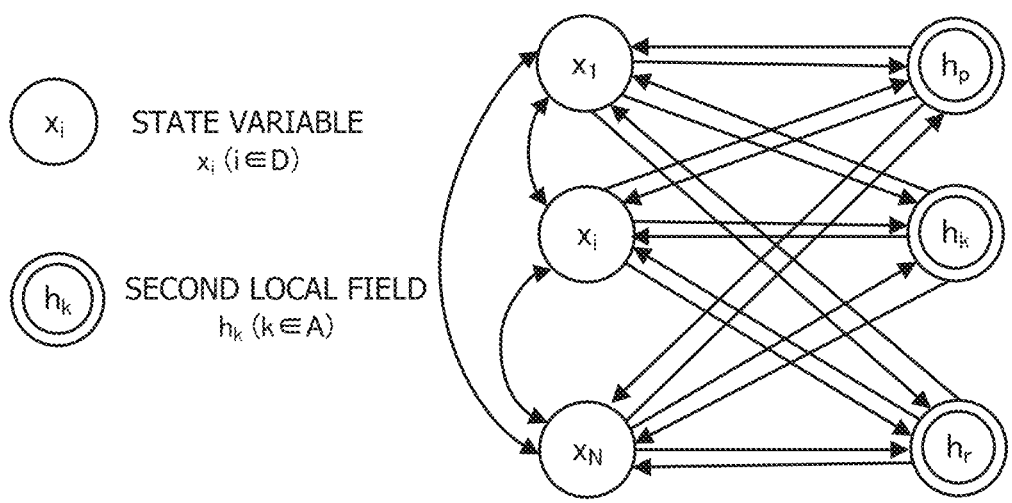
FIG. 1 is a diagram illustrating an example of a relationship between state variables and second local fields.

In the traditional multiple-bit transition process, the configuration for computing a change amount of a value of the evaluation function in a case where transitions of a plurality of bits occur, the configuration that propagates data, and the like become complicated. Therefore, implementation has not been easy.

In one aspect, an object of the embodiments is to provide a data processing device, a data processing program, and a data processing method capable of achieving implementation of a multiple-bit transition process of searching for a solution to a combinatorial optimization problem with a constraint condition.

Hereinafter, modes for carrying out the embodiments will be described with reference to the drawings.

A data processing device according to each of the embodiments to be described below searches for a solution to a combinatorial optimization problem with a constraint condition, using an MCMC method such as a simulated annealing method or a replica exchange method, and outputs the solution found by the search.

An evaluation function of the combinatorial optimization problem with a constraint condition is represented by, for example, the following formula.

[Mathematical Formula 1]

$$H(x) = -\frac{1}{2}\sum_{i \in D}\sum_{j \in D}W_{ij}x_ix_j - \sum_{i \in D}b_ix_i + \sum_{k \in A}\gamma_k g(h_k) \quad (1)$$

The first and second terms on the right side are the Ising-type evaluation function. The first term on the right side is for integrating products of values (0 or 1) of two state variables and a weighting factor (representing strength of correlation between the two state variables) for all combinations of state variables with neither omission nor duplication. A set of identification numbers of the state variables is represented by D. A state variable with an identification number of i is denoted by $x_i$, and a state variable with an identification number of j is denoted by $x_j$. A weighting factor indicating the magnitude of correlation between the state variables with identification numbers of i and j is denoted by $W_{ij}$. The second term on the right side is obtained by summing up products of a bias coefficient and a state variable for each identification number. A bias coefficient for the identification number of i is indicated by $b_i$.

The third term on the right side is a constraint term having a value according to the presence or absence of violation of the constraint condition. An identification number of a constraint condition is represented by k, and a set of identification numbers of constraint terms is represented by A. In addition, a proportional coefficient relating to the constraint condition with the identification number=k is denoted by $\gamma_k$. A weight of the constraint term concerning the constraint condition with the identification number=k is represented by $\gamma_k$. Different values may be assigned for $\gamma_k$ for each constraint term. A function according to the type of the constraint condition is denoted by $g(h_k)$. Hereinafter, $g(h_k)$ will also be sometimes referred to as a penalty function. A local field (LF) used to specify a constraint violation amount added to the value of the evaluation function when the constraint condition with the identification number=k is not satisfied is denoted by $h_k$. Following Formula (2) represents $h_k$. Note that, in the following, $h_k$ will also be sometimes referred to as a second local field in order to be distinguished from a first local field (also sometimes expressed as $h_i$) used to specify the change amount of the value of the evaluation function associated with a change in value of each of a plurality of state variables.

[Mathematical Formula 2]

$$h_k = \sum_{i \in D, k \in A} W_{ki} x_i + b_k \qquad (2)$$

In Formula (2), a coefficient (weighting factor) indicating the weight of $x_i$ with respect to the constraint condition with the identification number of k is denoted by $W_{ki}$. A coefficient relating to the constraint condition with the identification number=k is denoted by $b_k$.

FIG. 1 is a diagram illustrating an example of a relationship between state variables and the second local fields.

In FIG. 1, correlations between each of a plurality of state variables ($x_1$, $x_i$, and $x_N$ in the example in FIG. 1), and correlations between each of the plurality of state variables and a plurality of second local fields ($h_p$, $h_k$, and $h_r$ in the example in FIG. 1) are indicated by arrows. The magnitude of these correlations corresponds to $W_{ij}$ or $W_{ki}$.

In a case where the constraint condition with the identification number=k is an inequality constraint, $g(h_k)$ in Formula (1) can be represented by following Formula (3).

[Mathematical Formula 3]

$$g(h_k) = \max[0, h_k] \qquad (3)$$

In Formula (3), $\max[0, h_k]$ is a function that outputs a larger value of 0 and $h_k$. In a case where the constraint condition is an inequality constraint, $h_k$ can be represented by following Formula (4).

[Mathematical Formula 4]

$$h_k = R_k - U_k = \sum_{i \in D} W_{ki} x_i - U_k \qquad (4)$$

A consumption amount (also called a resource amount) of the constraint term with the identification number of k is represented by $R_k$, and an upper limit of the resource amount is represented by $U_k$. The first term on the right side of Formula (2) described above corresponds to $R_k$ in Formula (4), and $+b_k$ in Formula (2) corresponds to $-U_k$ in Formula (4). The difference between $R_k$ and $U_k$ is the constraint violation amount.

Note that another function (such as a step function, for example) can also be used as $g(h_k)$.

Hereinafter, the Ising-type evaluation function in the first and second terms on the right side of Formula (1) will also be sometimes expressed as E(x). In addition, the constraint term in the third term on the right side of Formula (1) will also be sometimes expressed as P(x). Using E(x) and P(x), the evaluation function of the combinatorial optimization problem with the constraint condition can be represented as H(x)=E(x)+P(x).

Note that the change amount ($\Delta H_i$) of the value of the evaluation function in a case where a value of a certain state variable ($x_i$) changes can be represented by following Formula (5), using the penalty function.

[Mathematical Formula 5]

$$\Delta H_i = -\left(\sum_{j \in D} W_{ij} x_j + b_i\right)\Delta x_i + \sum_{k \in A} \gamma_k (g(h_k + W_{ki}\Delta x_i) - g(h_k)) \qquad (5)$$

In Formula (5), $g(h_k + W_{ki}\Delta x_i) - g(h_k)$ represents a change amount of a value of the penalty function (which can also be referred to as a change amount of the constraint term) in a case where the value of the certain state variable ($x_i$) changes.

Figure 2:
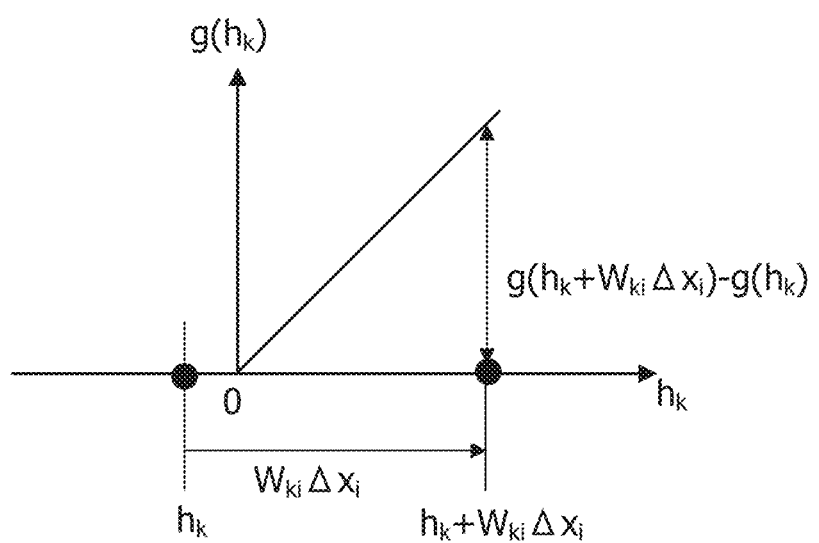
FIG. 2 is a diagram illustrating an example of a change amount of a value of a penalty function due to a change in a value of a state variable.

FIG. 2 is a diagram illustrating an example of the change amount of the value of the penalty function due to a change in the value of the state variable. The vertical axis represents the magnitude of $g(h_k)$, and the horizontal axis represents $h_k$.

In FIG. 2, $g(h_k)=\max[0, h_k]$ is used as an example of the penalty function. When $h_k$ changes to $h_k + W_{ki}\Delta x_i$ in association with a change in the value of $x_i$, the change amount of the value of the penalty function is represented as $g(h_k + W_{ki}\Delta x_i) - g(h_k)$.

As the first local field used to specify the change amount of the value of the evaluation function represented by Formula (5), a variable ($h_i$) represented by following Formula (6) can be used.

[Mathematical Formula 6]

$$h_i = -\left(\sum_{j \in D} W_{ij} x_j + b_i\right) - \sum_{k \in A} \gamma_k \Delta g(h_k, W_{ki}\Delta x_i) \qquad (6)$$

In Formula (6), $\Delta g(h_k, W_{ki}\Delta x_i)$ is represented by following Formula (7).

[Mathematical Formula 7]

$$\Delta g(h_k, W_{ki}\Delta x_i) = \Delta x_i [g(h_k + W_{ki}\Delta x_i) - g(h_k)] \qquad (7)$$

As in Formula (7), $\Delta g(h_k, W_{ki}\Delta x_i)$ is an amount that can be calculated from $x_i$, $h_k$, and $W_{ki}$.

By using $h_i$ as in Formula (6), $\Delta H_i$ can be represented as $\Delta H_i = -h_i \Delta x_i$.

The data processing device according to each of the embodiments to be described below performs a multiple-bit transition process of searching for a solution to a combinatorial optimization problem with a constraint condition, using the first local field ($h_i$) as described above. Note that, in the following description, the number of state variables included in the evaluation function as illustrated in Formula (1) is assumed as N, and the number of constraint conditions is assumed as M.

First Embodiment

Figure 3:
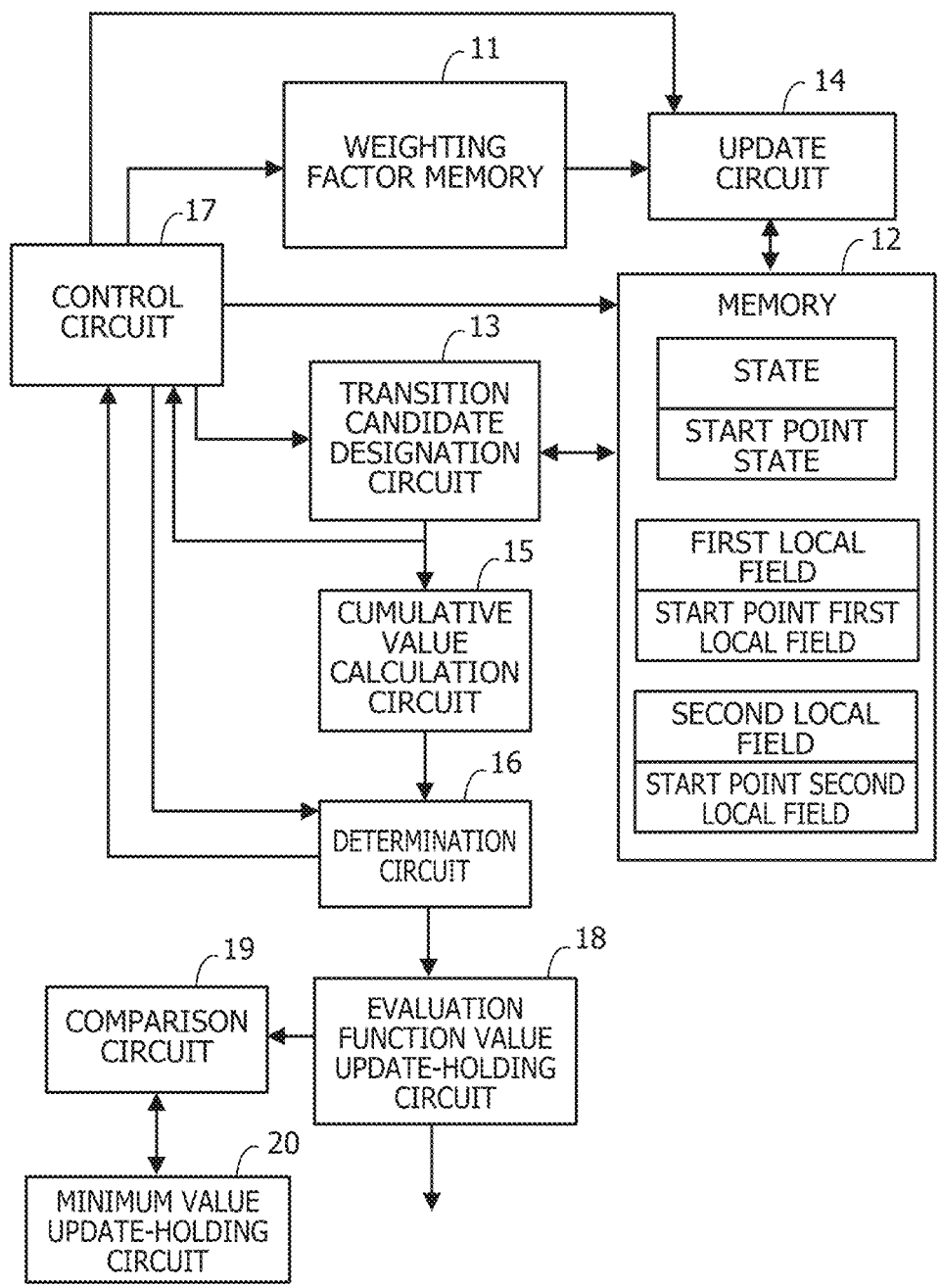
FIG. 3 is a diagram illustrating an example of a data processing device according to a first embodiment.

FIG. 3 is a diagram illustrating an example of a data processing device according to a first embodiment.

A data processing device 10 includes a weighting factor memory 11, a memory 12, a transition candidate designation circuit 13, an update circuit 14, a cumulative value calculation circuit 15, a determination circuit 16, a control circuit 17, an evaluation function value update-holding circuit 18, a comparison circuit 19, and a minimum value update-holding circuit 20.

The weighting factor memory 11 stores N×N instances of $W_{ij}$ and M×N instances of $W_{ki}$ included in Formula (6) that is a calculation formula for $h_i$. Note that, since $W_{ki}=W_{ik}$ is met, the weighting factor memory 11 does not have to store N×M instances of $W_{ik}$. In addition, the weighting factor memory 11 does not have to store $W_{ki}$ whose value is zero. For example, the weighting factor memory 11 can be formed by a volatile storage device that is an electronic circuit such as a dynamic random access memory (DRAM), a nonvolatile storage device that is an electronic circuit such as a flash memory, or the like. The weighting factor memory 11 may be a storage device such as a hard disk drive (HDD).

Note that the weighting factor memory 11 may store the bias coefficient ($b_i$), the proportional coefficient ($\gamma_k$), the coefficient ($b_k$) relating to a constraint condition, data of other computational conditions, and the like, as well as $W_{ij}$ and $W_{ki}$.

The memory 12 stores the values (hereinafter, also sometimes called states) of the N state variables ($x_1$ to $x_N$) included in the evaluation function and the values of the first local fields ($h_1$ to $h_N$) for each of the N state variables. In addition, the memory 12 stores values of the N state variables at a first time point of the solution search and values of the N first local fields at the first time point. Furthermore, the memory 12 stores values of M second local fields ($h_k$) and values of the M second local fields at the first time point.

Here, the first time point is, for example, a time point at which the multiple-bit transition process is started (hereinafter, referred to as a start point). In FIG. 3, the values of the N state variables at the start point are expressed as start point states, and the values of the N first local fields at the start point are expressed as start point first local fields. In addition, the values of the M second local fields at the start point are expressed as start point second local fields.

As the memory 12, a memory having a storage capacity smaller than the storage capacity of the weighting factor memory 11 can be used. For example, the memory 12 can be formed by a volatile storage device that is an electronic circuit such as a static random access memory (SRAM) or a register, or the like. However, the memory 12 is not limited to these storage devices.

Using the values of the N first local fields, the transition candidate designation circuit 13 calculates the change amount of the value of the evaluation function associated with a change in the value of each of the N state variables. The change amount ($\Delta H_i$) associated with a change in the value of $x_i$ can be represented as $\Delta H_i=-h_i\Delta x_i$. Therefore, the transition candidate designation circuit 13 can calculate $\Delta H_i$ by multiplying $h_i$ by $-\Delta x_i$. The transition candidate designation circuit 13 can compute N instances of $\Delta H_i$ in parallel. Furthermore, the transition candidate designation circuit 13 designates, from the start point, a candidate (hereinafter, referred to as a transition candidate) whose value is to be changed, one by one among $x_1$ to $x_N$, based on the N instances of $\Delta H_i$.

In the following example, description will be given on the assumption that the data processing device 10 performs an n (an integer equal to or greater than two)-bit multiple-bit transition process. n can also be called a transition bit depth. The transition candidate designation circuit 13 designates n of the above transition candidates one by one.

The transition candidate designation circuit 13 outputs the identification number of the state variable designated as the transition candidate and the change amount of the value of the evaluation function when the value of the transition candidate is changed. An example of a method for designating a transition candidate and an example of the transition candidate designation circuit 13 will be described later (see FIG. 5).

Every time the transition candidate is designated, the update circuit 14 updates the values of the transition candidates stored in the memory 12 and also updates the values of the N first local fields and the values of the M second local fields. In the following example, it is assumed that the update circuit 14 performs such update until n transition candidates are designated.

For example, in a case where $x_j$ is designated as a transition candidate, the update circuit 14 updates $h_i$ by adding $\Delta h_i=W_{ij}\Delta x_j$ to each of the N instances of $h_i$. Note that, in a case of i=j, $W_{ii}=0$ is met and $h_i$ does not change, such that no updating is involved.

In addition, in a case where $x_j$ is designated as a transition candidate, the update circuit 14 updates $h_k$ by adding $\Delta h_k=W_{kj}\Delta x_j$ to each of the M instances of $h_k$. Note that $h_k$ with $W_{kj}=0$ does not change, and thus no updating is involved.

FIG. 4 is a diagram illustrating an example of updating the first local fields and the second local fields in a case where a value of $x_j$ has changed. In the example in FIG. 4, the N first local fields are indicated by $h_1$ to $h_N$, and the M second local fields are indicated by $h_{N+1}$ to $h_{N+M}$. Such computation can be performed by parallel computation with a degree of parallelism of N+M.

Furthermore, at a second time point, the update circuit 14 further updates the values of the first local fields, using the values at the first time point and the values at the second time point of the second local fields. The second time point may be when the second local fields are updated. That is, the values of the N first local fields may be updated using the updated second local fields every time the transition candidate is designated. Alternatively, the second time point may be a time point when the transition candidate has been designated a plurality of times. For example, the second time point may be a time point when the transition candidate has been designated n−1 times.

The update of $h_i$ using $h_k$ at the second time point can be represented by, for example, following Formula (8).

[Mathematical Formula 8]

$$h_i \leftarrow h_i - \gamma_k\left[\Delta g(h_k, W_{ki}\Delta x_i) - \Delta g(h_k^{(old)}, W_{ki}\Delta x_i)\right] \qquad (8)$$

In Formula (8), $h_k^{(old)}$ represents the second local fields at the first time point stored in the memory 12. Note that, in a case of i=j, $h_i$ does not change, and thus no updating is involved. Hereinafter, $\gamma_k[\Delta g(h_k, W_{ki}\Delta x_i)-\Delta g(h_k^{(old)}, W_{ki}\Delta x_i)]$ in Formula (8) will also be sometimes expressed as $\delta h_i$.

Note that, in the update process as described above, the states (start point states), the values of the first local fields (start point first local fields), and the values of the second local fields (start point second local fields) at the first time point are not updated. The update here is a provisional update, and the updated states and values of the first local fields and the second local fields will be returned to the start point states and the values of the start point first local fields and the start point second local fields in some cases by processing to be described later. The update circuit 14 performs the above update process under the control of the control circuit 17.

The cumulative value calculation circuit 15 calculates a cumulative value of the change amount of the value of the evaluation function when the value of the transition candidate is changed. The cumulative value calculation circuit 15 can be formed using an adder, a register, or the like, for example.

The determination circuit 16 determines whether or not to accept changes in the values of the n transition candidates, based on the cumulative value of the change amount of the value of the evaluation function, by the MCMC processing. For example, when the cumulative value of the change amount is expressed as $\Delta E_i$, an acceptance probability $A_i$ of accepting changes in the values of the state variables that cause $\Delta E_i$ can be represented by Formula (9).

[Mathematical Formula 9]

$$A_i = \begin{cases} \min[1, \exp(-\beta\Delta E_i)] & \text{Metropolis Method} \\ 1/[1+\exp(\beta\Delta E_i)] & \text{Gibbs Method} \end{cases} \quad (9)$$

The reciprocal ($\beta=1/T$) of a parameter T (T>0) representing a temperature is denoted by $\beta$ and is called an inverse temperature. Hereinafter, $\beta$ and T will also be sometimes referred to as temperature values. The min operator indicates that a minimum value of arguments is taken. The upper right side of Formula (9) corresponds to the Metropolis method. The lower right side of Formula (9) corresponds to the Gibbs method.

The determination circuit 16 makes a determination so as to accept changes in the values of the n transition candidates, for example, at the acceptance probability $A_i$ in Formula (9). The determination circuit 16 that makes such a determination can be formed using a comparator or the like that, for example, outputs a value based on a comparison result between a uniform random number having a value from 0 to 1 and $A_i$.

In a case where the determination circuit 16 has determined to accept changes in the values of the n transition candidates, the control circuit 17 causes the update circuit 14 to update the values of the N state variables and the values of the first and second local fields stored in the memory 12 to values in a case where the value of the n-th transition candidate has changed. In addition, in a case where the determination circuit 16 has determined not to accept changes in the values of the n transition candidates, the control circuit 17 returns each of the updated values of the N state variables and values of the first and second local fields to the values at the first time point.

In addition, the control circuit 17 has a function of controlling the operation of each element illustrated in FIG. 1.

For example, the control circuit 17 performs control to cause the update circuit 14 to read $W_{ij}$ or $W_{ki}$ corresponding to identification numbers output by the transition candidate designation circuit 13, from the weighting factor memory 11. Furthermore, the control circuit 17 controls the temperature value (T or $\beta$) used in the determination process by the determination circuit 16. In a case where the simulated annealing method is used as the MCMC method, the control circuit 17 gradually decreases the value of T in line with a predetermined schedule, for example. In a case where the replica exchange method is used as the MCMC method, the control circuit 17 performs control such that the processing of each circuit described above is performed independently of each other, for a plurality of replicas of the Ising model. The control circuit 17 sets different temperature values in each of the plurality of replicas and exchanges the temperature values between the replicas at a predetermined exchange probability in a predetermined cycle.

In addition, the control circuit 17 may switch whether to cause the transition candidate designation circuit 13 to execute the single-bit transition process or the multiple-bit transition process, based on the determination result output by the determination circuit 16. For example, when a determination result indicating that a change in value is not accepted continues for a predetermined period at the time of solution search in the single-bit transition process, the control circuit 17 switches the single-bit transition process to the multiple-bit transition process.

In the single-bit transition process, the transition candidate designation circuit 13 performs a process of determining whether or not to permit a change in value, for each of the N state variables, based on the change amount of the value of the evaluation function. The determination at this time is made in accordance with the MCMC method similarly to the determination circuit 16. In the multiple-bit transition process, the transition candidate designation circuit 13 performs a process of designating transition candidates one by one from the start point.

When a determination result indicating that a change in value is not accepted continues for a predetermined period at the time of solution search by the multiple-bit transition process, the control circuit 17 may increase the value of n in the multiple-bit transition process. In a case where a determination result indicating that a change in value is accepted is obtained at the time of solution search by the multiple-bit transition process, or in a case where such a determination result continues for a predetermined period, the control circuit 17 may switch the multiple-bit transition process to the single-bit transition process.

In addition, in a case where the determination circuit 16 has determined not to accept changes in the values of the n transition candidates, the control circuit 17 may control the transition candidate designation circuit 13 such that the same n transition candidates are not selected again.

The evaluation function value update-holding circuit 18 includes, for example, a holding circuit such as a register and holds the value of the evaluation function. In a case where the determination circuit 16 has determined to accept changes in the values of the n transition candidates, the evaluation function value update-holding circuit 18 acquires the cumulative value of the change amount of the value of the evaluation function calculated by the cumulative value calculation circuit 15, updates the value of the evaluation function with the acquired cumulative value, and outputs the updated value.

The comparison circuit 19 compares the value of the evaluation function held in the evaluation function value update-holding circuit 18 with the minimum value of the evaluation function held in the minimum value update-holding circuit 20.

The minimum value update-holding circuit 20 includes, for example, a holding circuit such as a register and holds the minimum value of the evaluation function obtained until then. In a case where the comparison circuit 19 outputs a comparison result indicating that the value of the evaluation function held in the evaluation function value update-holding circuit 18 is smaller than the minimum value obtained until then, the minimum value update-holding circuit 20 updates the minimum value with that value of the evaluation function. In addition, the minimum value update-holding circuit 20 holds the values of the N state variables when the minimum value was obtained. The values of the N state variables held when a predetermined end condition is satisfied, for example, are then output as a solution to the combinatorial optimization problem.

Figure 5:
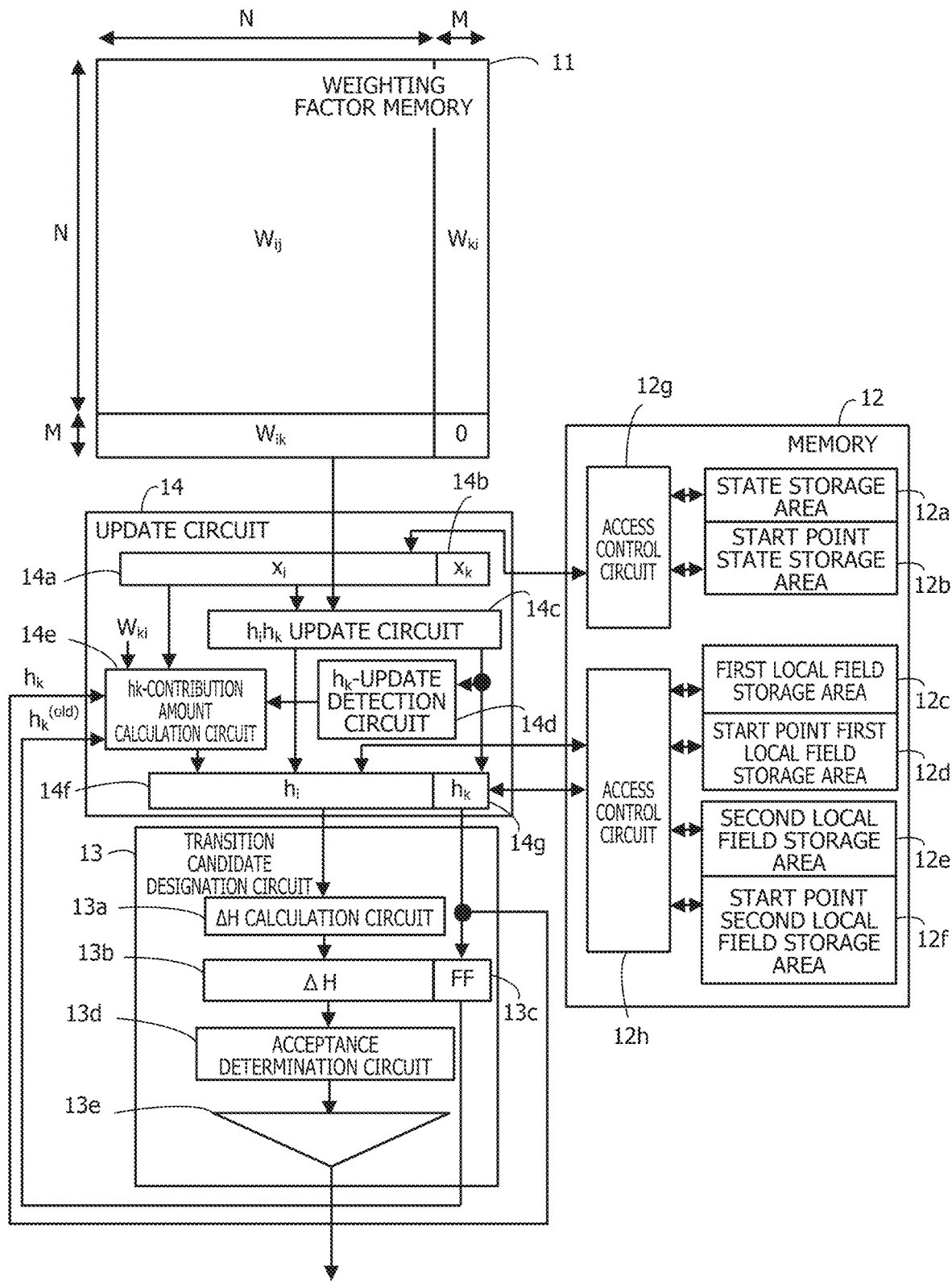
FIG. 5 is a diagram illustrating a circuit example of a memory, an update circuit, and a transition candidate designation circuit.

FIG. 5 is a diagram illustrating a circuit example of the memory, the update circuit, and the transition candidate designation circuit. Note that FIG. 5 also illustrates an example of storing the weighting factors ($W_{ij}$, $W_{ki}$, and $W_{ik}$) in the weighting factor memory 11.

The memory 12 includes a state storage area 12a, a start point state storage area 12b, a first local field storage area 12c, a start point first local field storage area 12d, a second local field storage area 12e, a start point second local field storage area 12f, and access control circuits 12g and 12h.

The values of the N state variables are stored in the state storage area 12a, and the values of the N state variables at the first time point (hereinafter, assumed as the start point described above) of the solution search are stored in the start point state storage area 12b. The values of the N first local fields are stored in the first local field storage area 12c, and the values of the N first local fields at the start point are stored in the start point first local field storage area 12d. The values of the M second local fields are stored in the second local field storage area 12e, and the values of the M second local fields at the start point are stored in the start point second local field storage area 12f.

The access control circuit 12g controls reading and writing of the states between the state storage area 12a, the start point state storage area 12b, and a state update-holding circuit 14a of the update circuit 14 under the control of the control circuit 17 illustrated in FIG. 3. Under the control of the control circuit 17, for example, an operation as described below is performed.

In a case where the state variable is updated, the access control circuit 12g overwrites the value of the state variable stored in the state storage area 12a with the updated value of the state variable.

In a case where the determination circuit 16 illustrated in FIG. 3 has determined to accept changes in the values of the n transition candidates, the access control circuit 12g overwrites the start point states in the start point state storage area 12b with the values of the N state variables in the state storage area 12a. Note that the values of the N state variables in the state storage area 12a are values obtained by updating n values among the values of the N state variables at the start point.

In a case where the determination circuit 16 has determined not to accept changes in the values of the n transition candidates, the access control circuit 12g overwrites the values of the N state variables in the state storage area 12a with the values of the N state variables at the start point in the start point state storage area 12b.

The access control circuit 12h controls reading and writing of the first local fields between the first local field storage area 12c, the start point first local field storage area 12d, and an $h_i$-holding circuit 14f of the update circuit 14 under the control of the control circuit 17. In addition, the access control circuit 12h controls reading and writing of the second local fields between the second local field storage area 12e, the start point second local field storage area 12f, and an $h_k$-holding circuit 14g of the update circuit 14 under the control of the control circuit 17. Under the control of the control circuit 17, for example, an operation as described below is performed.

In a case where the processing of the transition candidate designation circuit 13 is performed, the access control circuit 12h writes the values of the N first local fields in the first local field storage area 12c into the $h_i$-holding circuit 14f.

In a case where the value of the first local field is updated, the access control circuit 12h overwrites the value of the local field in the first local field storage area 12c with the updated value of the first local field.

In a case where the determination circuit 16 has determined to accept changes in the values of the n transition candidates, the access control circuit 12h overwrites the values of the N first local fields at the start point in the start point first local field storage area 12d with the values of the N first local fields in the first local field storage area 12c.

In a case where the determination circuit 16 has determined not to accept changes in the values of the n transition candidates, the access control circuit 12h overwrites the values of the N first local fields in the first local field storage area 12c with the values of the N first local fields at the start point in the start point first local field storage area 12d.

In a case where the processing of the transition candidate designation circuit 13 is performed, the access control circuit 12h writes the values of M auxiliary variables in the second local field storage area 12e into the $h_k$-holding circuit 14g.

In a case where the value of the second local field is updated, the access control circuit 12h overwrites the value of the second local field in the second local field storage area 12e with the updated value of the second local field.

In a case where the determination circuit 16 has determined to accept changes in the values of the n transition candidates, the access control circuit 12h overwrites the values of the M second local fields at the start point in the start point second local field storage area 12f with the values of the M second local fields in the second local field storage area 12e.

In a case where the determination circuit 16 has determined not to accept changes in the values of the n transition candidates, the access control circuit 12h overwrites the values of the M second local fields in the second local field storage area 12e with the values of the M second local fields at the start point in the start point second local field storage area 12f.

At the second time point at which the first local field is updated using the value of the second local field, for example, the access control circuit 12h writes the values of the M second local fields in the start point second local field storage area 12f into the $h_k$-holding circuit 14g.

The transition candidate designation circuit 13 includes a $\Delta H$ calculation circuit 13a, a $\Delta H$ holding circuit 13b, a flip-flop (FF) 13c, an acceptance determination circuit 13d, and a selection circuit 13e.

The $\Delta H$ calculation circuit 13a calculates the change amount of the value of the evaluation function associated with a change in the value of each of the N state variables, using the values of the N first local fields. The change amount ($\Delta H_i$) associated with a change in the value of $x_i$ can be represented as $\Delta H_i = -h_i \Delta x_i$. $\Delta x_i$ can be obtained from the values of $x_1$ to $x_N$ held in the state storage area 12a.

Note that the $\Delta H$ calculation circuit 13a may not calculate $\Delta H_i$ for a state variable that has become a transition candidate once while the n transition candidates are designated. This is to avoid a state variable that has once become the transition candidate from becoming the transition candidate again and the value of that state variable from returning to the original state.

The $\Delta H$ holding circuit 13b holds N instances of $\Delta H_i$ calculated by the $\Delta H$ calculation circuit 13a.

The FF 13c holds the value of $h_k$ and delays the timing of outputting $h_k$, thereby supplying $h_k^{(old)}$ to an $h_k$-contribution amount calculation circuit 14e of the update circuit 14.

The acceptance determination circuit 13d accepts a change in the value of at least one state variable. For example, the acceptance determination circuit 13d outputs the identification number of the state variable that causes $\Delta H_i$ in which the value of the evaluation function becomes the lowest when the value has changed, and that $\Delta H_i$. For example, the acceptance determination circuit 13d may output the identification numbers of a plurality of state variables that cause $\Delta H_i$ smaller than a predetermined threshold value, and these instances of $\Delta H_i$. The acceptance determination circuit 13d may accept changes in the values of one or more state variables in accordance with a predetermined rule.

Note that, in a case where the single-bit transition process is performed, the acceptance determination circuit 13d accepts a change in the value of each state variable at the acceptance probability indicated by Formula (9).

In a case where the acceptance determination circuit 13d has accepted changes in the values of a plurality of state variables, the selection circuit 13e selects one of the plurality of state variables of which the changes in the values have been accepted and outputs the identification number of the selected state variable and $\Delta H_i$ associated with the change in the value of the selected state variable. For example, the selection circuit 13e may randomly select one state variable or may select one state variable in accordance with a predetermined rule.

The identification number of the state variable selected by the selection circuit 13e is supplied to the control circuit 17 illustrated in FIG. 3, and $\Delta H_i$ associated with a change in the value of the selected state variable is supplied to the cumulative value calculation circuit 15.

The update circuit 14 includes the state update-holding circuit 14a, an $x_k$-holding circuit 14b, an $h_i h_k$ update circuit 14c, an $h_k$-update detection circuit 14d, the $h_k$-contribution amount calculation circuit 14e, the $h_i$-holding circuit 14f, and the $h_k$-holding circuit 14g.

The state update-holding circuit 14a holds the values of the N state variables. In addition, the state update-holding circuit 14a updates the value of the state variable selected by the selection circuit 13e under the control of the control circuit 17.

The $x_k$-holding circuit 14b holds M values of $x_k$. For example, $x_k$ can be used to detect whether or not the constraint condition with the identification number=k is satisfied. In a case of the inequality constraint, as illustrated in FIG. 2, $g(h_k)>0$ is met in a case of $h_k>0$, and constraint condition violation occurs. Therefore, for example, the $x_k$-holding circuit 14b may hold $x_k=1$ when $h_k>0$ is met and may hold $x_k=0$ when $h_k \leq 0$ is met. However, the data processing device 10 of the present embodiment does not have to use $x_k$. In that case, the $x_k$-holding circuit 14b is not involved.

Under the control of the control circuit 17, the $h_i h_k$ update circuit 14c updates the values of the first local field ($h_i$) and the second local field ($h_k$) in association with a change in the value of the state variable selected by the selection circuit 13e. For example, in a case where $x_j$ is a transition candidate, $h_i$ is updated to a value of $h_i = h_i + W_{ij} \Delta x_j$. In addition, in a case where $x_j$ is designated as a transition candidate, the $h_i h_k$ update circuit 14c updates $h_k$ to a value of $h_k = h_k + W_{kj} \Delta x_j$.

The $h_k$-update detection circuit 14d detects update of $h_k$. In a case of $W_{kj}=0$, no update of $h_k$ regarding the constraint condition with the identification number=k is detected.

The $h_k$-contribution amount calculation circuit 14e reads non-zero $W_{ki}$ from the weighting factor memory 11 in order to calculate an amount of change of $h_i$ ($\delta h_i$) due to a change in the value of $h_k$ whose update has been detected. Furthermore, the $h_k$-contribution amount calculation circuit 14e acquires $h_k$ from the $h_k$-holding circuit 14g and acquires $h_k^{(old)}$ from the FF 13c. Then, the $h_k$-contribution amount calculation circuit 14e calculates $\delta h_i$ and updates $h_i$ by adding $\delta h_i$ to the original $h_i$.

In a case where the second time point at which the value of $h_i$ is updated based on the value of $h_k$ is a time point when n−1 transition candidates have been designated, the value of the second local field at the start point is used as $h_k^{(old)}$.

The $h_i$-holding circuit 14f holds the values of the N first local fields.

The $h_k$-holding circuit 14g holds the values of the M second local fields.

Each of the circuits in the data processing device 10 as described above can be formed using an electronic circuit such as an application specific integrated circuit (ASIC) or a field programmable gate array (FPGA), for example. In addition, at least a part of each circuit in the data processing device 10 can also be formed by software processing by a processor executing a program. Examples of the processor include a central processing unit (CPU), a graphics processing unit (GPU), a digital signal processor (DSP), and the like.

Next, a flow of a data processing method (solution search) by the data processing device 10 as described above will be described with reference to a flowchart.

Figure 6:
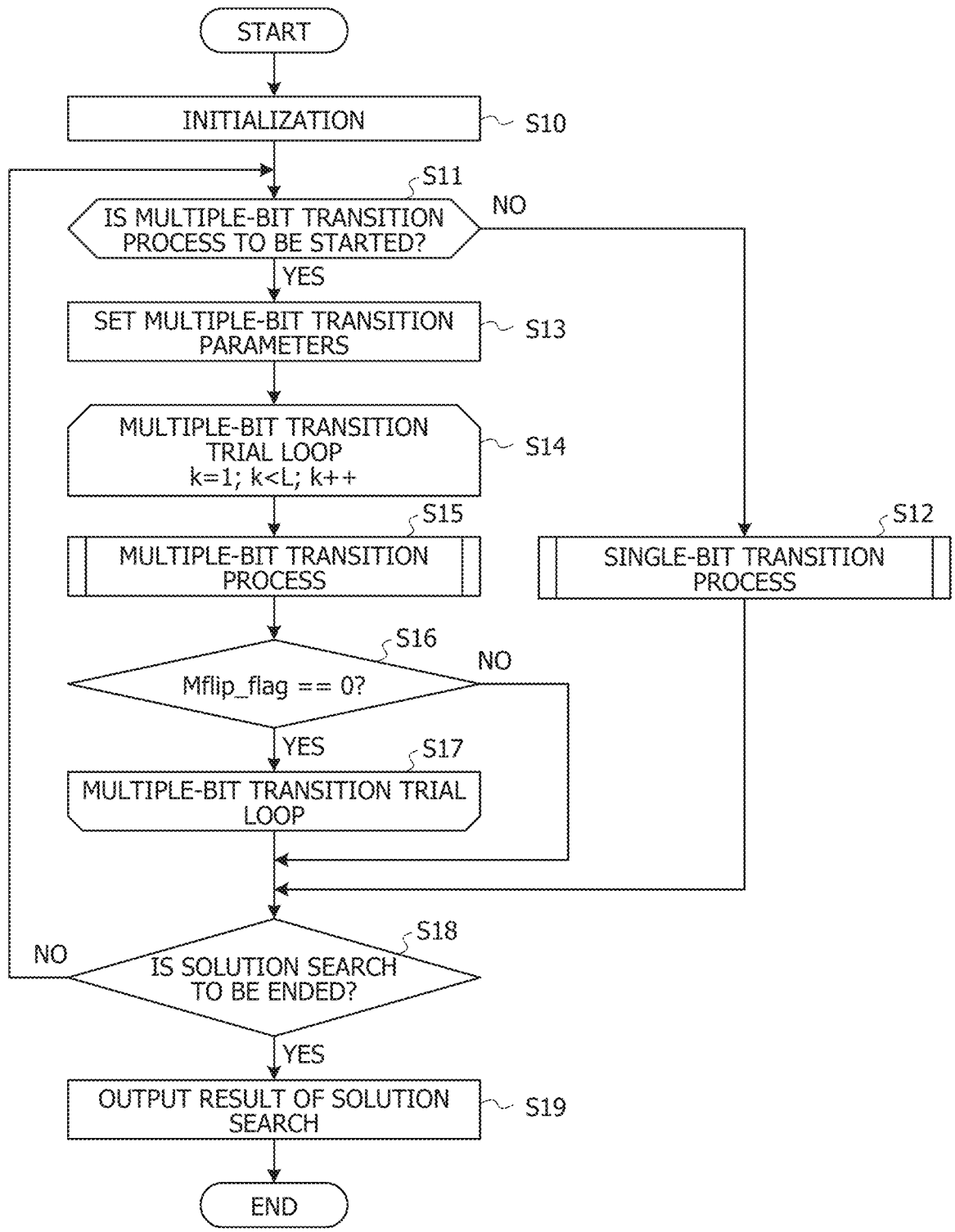
FIG. 6 is a flowchart illustrating a flow of an example of a data processing method according to the first embodiment.

FIG. 6 is a flowchart illustrating a flow of an example of the data processing method according to the first embodiment.

First, initialization is performed under the control of the control circuit 17 (step S10). In the processing in step S10, initial values of the N state variables, an initial value of the evaluation function, initial values of the N first local fields, and initial values of the M second local fields are set, and an end condition of the solution search, and the like are set. Furthermore, in a case where the simulated annealing method is performed, for example, a start value and an end value of the temperature value, a value by which the temperature value is multiplied for each predetermined temperature shifting cycle, and the like are set. In a case where the replica exchange method is performed, temperature values are set in each replica, a replica exchange cycle and the like are set.

The control circuit 17 determines whether or not to start the multiple-bit transition process (step S11). For example, the control circuit 17 causes the single-bit transition process to be started at the time of starting a solution search and causes the multiple-bit transition process to be started in a case where a determination result indicating that a change in value is not accepted continues for a predetermined period.

In a case where the control circuit 17 has determined not to start the multiple-bit transition process, the process in step S12 is performed. In the process in step S12, the single-bit transition process is performed. A flow of the single-bit transition process will be described later (see FIG. 7). After the process in step S12, the process in step S18 is performed.

In a case where the control circuit 17 has determined to start the multiple-bit transition process, the process in step S13 is performed. In the process in step S13, various multiple-bit transition parameters used when the multiple-bit transition process is performed are set. The various multiple-bit transition parameters include n, which is the transition bit depth described above, and the number of repeated trials L, which is the number of times of repeating trials of the multiple-bit transition process. A user may input n and L to the data processing device 10, or n and L may be preset in a holding circuit such as a register in the data processing device 10. Furthermore, the control circuit 17 sets a flag variable Mflip_flag, which has 1 when changes in the values of a plurality of transition candidates is permitted, to 0.

After the process in step S13, processes of a multiple-bit transition trial loop (steps S14 to S17) are repeated for k=1 to k<L.

In the multiple-bit transition trial loop, the multiple-bit transition process is performed (step S15). A flow of the multiple-bit transition process will be described later (see FIG. 8).

After the process in step S15, the control circuit 17 determines whether or not Mflip_flag has 0 (step S16). In a case where the control circuit 17 has determined that Mflip_flag has 0, the control circuit 17 repeats the processes from step S15 by incrementing k by 1 when k<L is met.

In a case where the control circuit 17 has determined that Mflip_flag does not have 0 or in a case where k reaches L, the control circuit 17 performs the process in step S18.

In the process in step S18, the control circuit 17 determines whether or not to end the solution search. For example, in a case where a predetermined end condition is satisfied, the control circuit 17 determines to end the solution search, causes a solution to the combinatorial optimization problem, which is a result of the solution search, to be output (step S19), and ends the process. In the process in step S19, for example, when it is determined to end the solution search, the values of the N state variables held in the minimum value update-holding circuit 20 are output as a solution to the combinatorial optimization problem. The control circuit 17 may cause a display device (not illustrated) to display the solution or may cause a communication circuit (not illustrated) to transmit the solution to an external device.

In a case where the control circuit 17 has determined not to end the solution search, the control circuit 17 repeats the processes from step S11.

Figure 7:
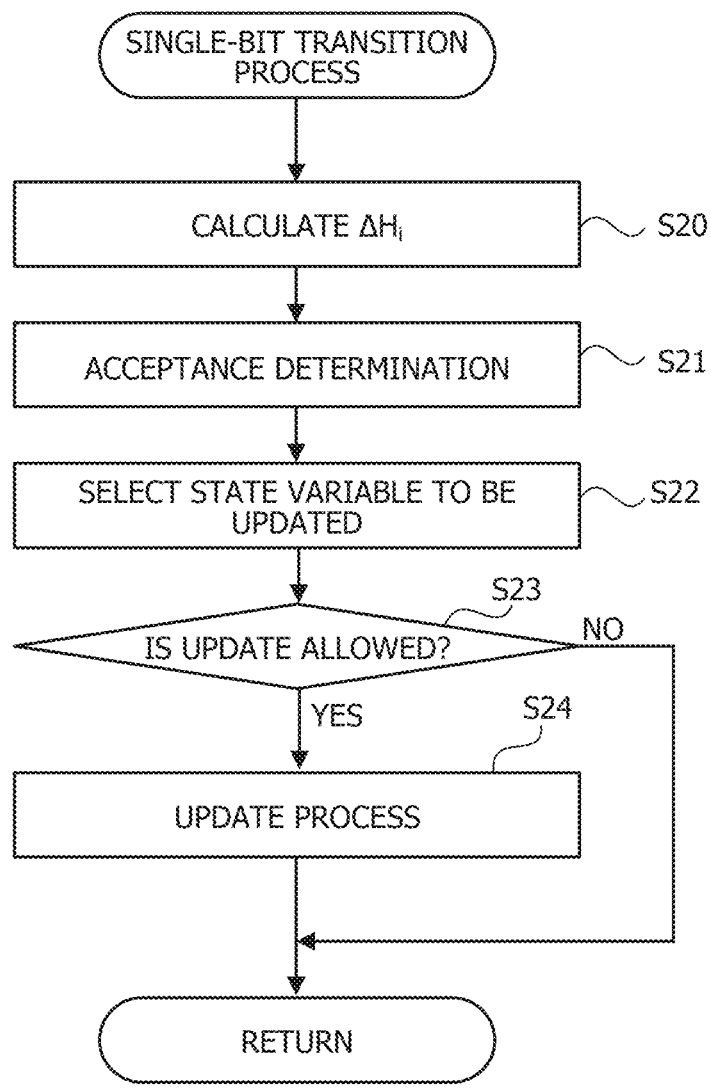
FIG. 7 is a flowchart illustrating a flow of an example of a single-bit transition process.

FIG. 7 is a flowchart illustrating a flow of an example of the single-bit transition process.

The transition candidate designation circuit 13 calculates $\Delta H_i$ for each of the N state variables, using the current values of the N first local fields (step S20).

Then, the transition candidate designation circuit 13 performs acceptance determination (step S21). For example, the transition candidate designation circuit 13 accepts a change in the value of each state variable at the acceptance probability indicated by Formula (9), based on $\Delta H_i$ for each of the N state variables and the temperature value supplied from the control circuit 17.

In a case where changes in the values of a plurality of state variables have been accepted, the transition candidate designation circuit 13 selects one state variable to be updated (step S22).

Thereafter, the transition candidate designation circuit 13 determines whether or not the update is allowed (step S23). For example, in a case where a change in the value is not accepted for any state variable in the process in step S21, it is determined that the update is not allowed.

In a case where the transition candidate designation circuit 13 has determined that the update is allowed, the update circuit 14 performs the update process (step S24). In the update process, the value of a state variable allowed to be updated changes. Then, based on that change, the values of the first and second local fields are updated.

At this time, the evaluation function value update-holding circuit 18 updates the held value of the evaluation function, based on $\Delta H_i$ associated with the change in the value of the state variable allowed to be updated. In a case where the updated value of the evaluation function is smaller than the minimum value of the evaluation function held in the minimum value update-holding circuit 20, the minimum value is updated and held in the minimum value update-holding circuit 20 together with the current values of the N state variables.

In a case where it is determined that the update is not allowed in the process in step S23, or after the process in step S24, the processing of the data processing device 10 returns to the process in step S18 illustrated in FIG. 6.

Figure 8:
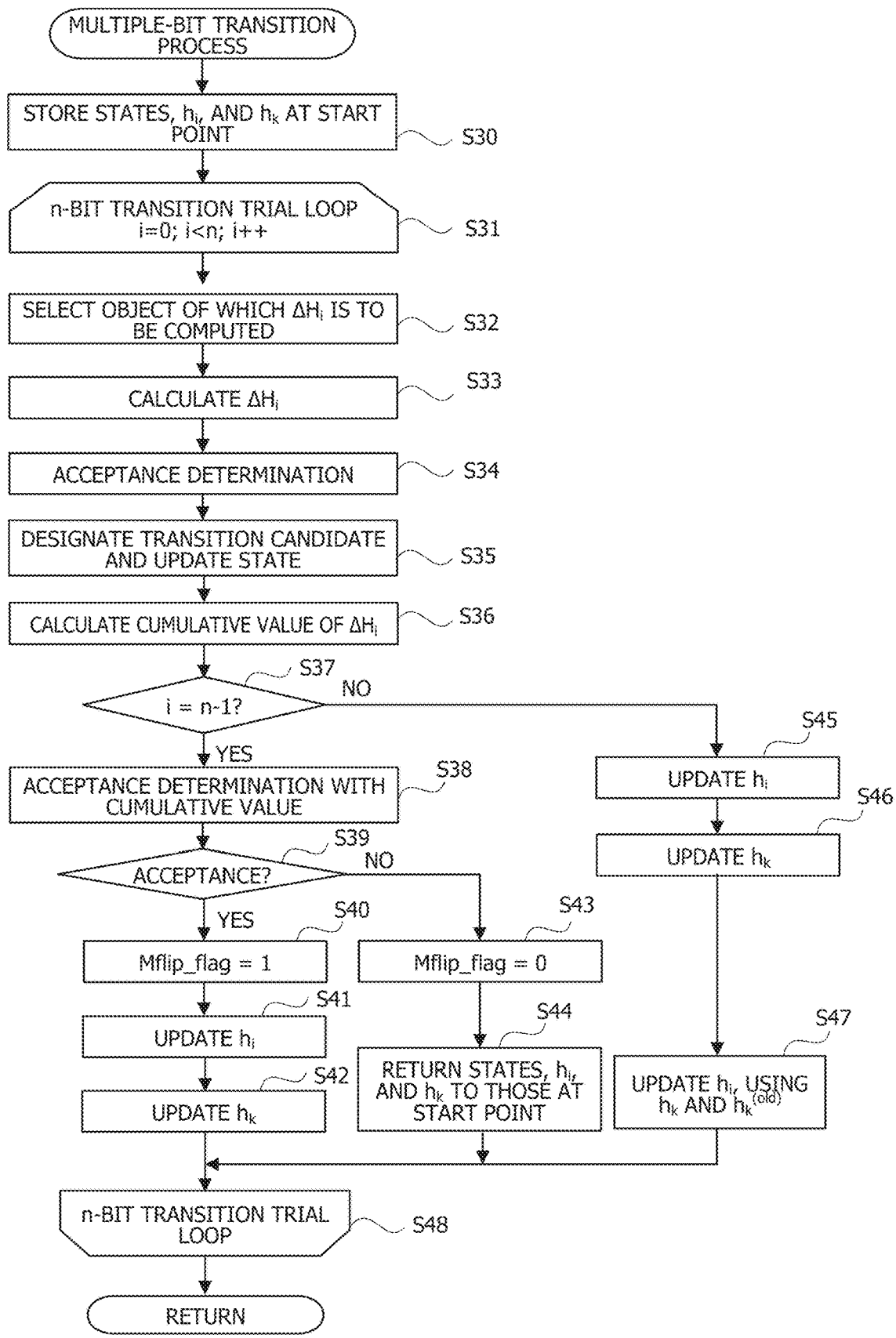
FIG. 8 is a flowchart illustrating a flow of an example of a multiple-bit transition process of the data processing method according to the first embodiment.

FIG. 8 is a flowchart illustrating a flow of an example of the multiple-bit transition process of the data processing method according to the first embodiment.

The memory 12 stores the states and the values of $h_i$ and $h_k$ at the start point (step S30).

Thereafter, processes of an n-bit transition trial loop to be described below (steps S31 to S48) are repeated for i=0 to i<n.

In the n-bit transition trial loop, the transition candidate designation circuit 13 selects an object of which $\Delta H_i$ is to be computed (step S32). While n transition candidates are designated, a state variable that has become a transition candidate once is excluded from the objects of which $\Delta H_i$ is to be computed. The transition candidate designation circuit 13 calculates $\Delta H_i$ selected as an object to be computed, using $h_i$ stored in the memory 12 (step S33).

Then, the transition candidate designation circuit 13 performs acceptance determination (step S34). The transition candidate designation circuit 13 accepts a change in the value of at least one state variable.

In a case where changes in the values of a plurality of state variables have been accepted, the transition candidate designation circuit 13 selects one of the plurality of state variables and designates the selected state variable as a transition candidate. In addition, the update circuit 14 updates the state by changing the value of the designated transition candidate (step S35). The update of the state here is a provisional update.

After the process in step S35, the cumulative value calculation circuit 15 calculates a cumulative value of $\Delta H_i$ when the value of the transition candidate is changed (step S36).

After the process in step S36, the control circuit 17 determines whether or not i has n−1 (step S37). That is, it is determined whether or not n transition candidates have been designated. In a case where the control circuit 17 has determined that i has n−1, the process in step S38 is performed. In a case where the control circuit 17 has determined that i does not have n−1, the process in step S45 is performed.

In the process in step S38, the determination circuit 16 determines whether or not to accept changes in the values of the n transition candidates, based on the cumulative value of $\Delta H_i$ in accordance with the MCMC method.

The control circuit 17 determines whether or not the determination circuit 16 has accepted changes in the values of the n transition candidates (step S39). In a case where the control circuit 17 has determined that the determination circuit 16 has accepted changes in the values of the n transition candidates, the control circuit 17 performs the process in step S40. In a case where the control circuit 17 has determined that the determination circuit 16 has not accepted changes in the values of the n transition candidates, the control circuit 17 performs the process in step S43.

In the process in step S40, the control circuit 17 assigns the value of Mflip_flag as 1. Thereafter, the update circuit 14 updates the value of $h_i$ (step S41) and updates $h_k$ (step S42) in association with a change in the value of the n-th transition candidate.

In the process in step S43, the control circuit 17 assigns the value of Mflip_flag as 0. Thereafter, the control circuit 17 returns the states and the values of $h_i$ and $h_k$ to the stored states and values at the start point (step S44).

After the process in steps S42 and S44, i is incremented by 1 to be i=n, and accordingly, the processing of the data processing device 10 exits the n-bit transition trial loop and returns to the process in step S18 illustrated in FIG. 6.

The update circuit 14 updates the value of $h_i$ (step S45) and updates the value of $h_k$ (step S46) in association with the change in the value of the transition candidate designated this time. Then, the update circuit 14 further updates the value of $h_i$, using $h_k$ and $h_k^{(old)}$ (step S47).

Thereafter, i is incremented by 1, and the n-bit transition trial loop is repeated.

Figure 9:
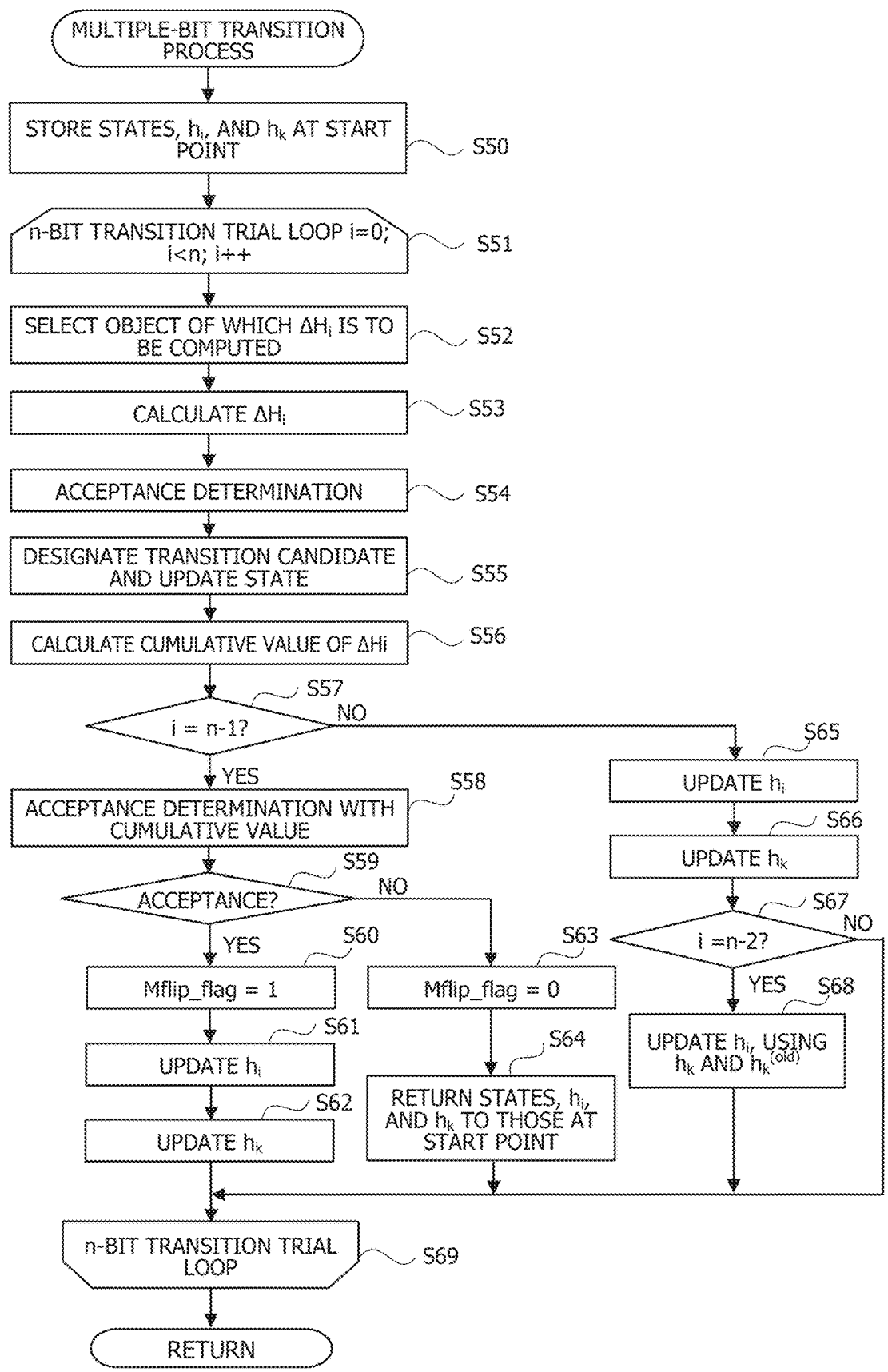
FIG. 9 is a flowchart illustrating a flow of another example of the multiple-bit transition process of the data processing method according to the first embodiment.

FIG. 9 is a flowchart illustrating a flow of another example of the multiple-bit transition process of the data processing method according to the first embodiment.

The processes in steps S50 to S66 are the same as the processes in steps S30 to S46 illustrated in FIG. 8.

After the process in step S66, the control circuit 17 determines whether or not i has n−2 (step S67). That is, it is determined whether or not n−1 transition candidates have been designated. In a case where the control circuit 17 has determined that i has n−2, the process in step S68 is performed. In a case where the control circuit 17 has determined that i does not have n−2, i is incremented by 1, and the n-bit transition trial loop (steps S51 to S69) is repeated.

In the process in step S68, the update circuit 14 updates the value of $h_i$, using $h_k$ and $h_k^{(old)}$, which is $h_k$ at the start point. Thereafter, i is incremented by 1, and the n-bit transition trial loop (steps S51 to S69) is repeated.

Note that, in the examples in FIGS. 8 and 9, an example in which the acceptance determination is performed based on the cumulative value of $\Delta H_i$ for all the n transition candidates has been described, but this example is not restrictive. For example, the acceptance determination may be performed based on the cumulative value of $\Delta H_i$ calculated every time a transition candidate is designated.

Furthermore, the order of the processes illustrated in FIGS. 6 to 9 is an example, and the order of the processes may be altered as appropriate.

(Example of Pipeline Process)

The above processes can be performed in parallel for a plurality of replicas, using a pipeline process. The memory 12 stores the values of the N state variables, the values of the N first local fields, and the values of the M second local fields by an amount equal to the number of the plurality of replicas. In addition, the memory 12 may also store the values of the N state variables, the values of the N first local fields, and the values of the M second local fields at the start point by an amount equal to the number of the plurality of replicas, or may store the values common to all the replicas. $W_{ij}$, $W_{kj}$, and $W_{ik}$ stored in the weighting factor memory 11 are common to all the replicas.

The control circuit 17 causes the transition candidate designation circuit 13, the update circuit 14, the cumulative value calculation circuit 15, and the determination circuit 16 to perform the pipeline process for the plurality of replicas. Note that the control circuit 17 may control such that the single-bit transition process is performed for some replicas.

Figure 10:
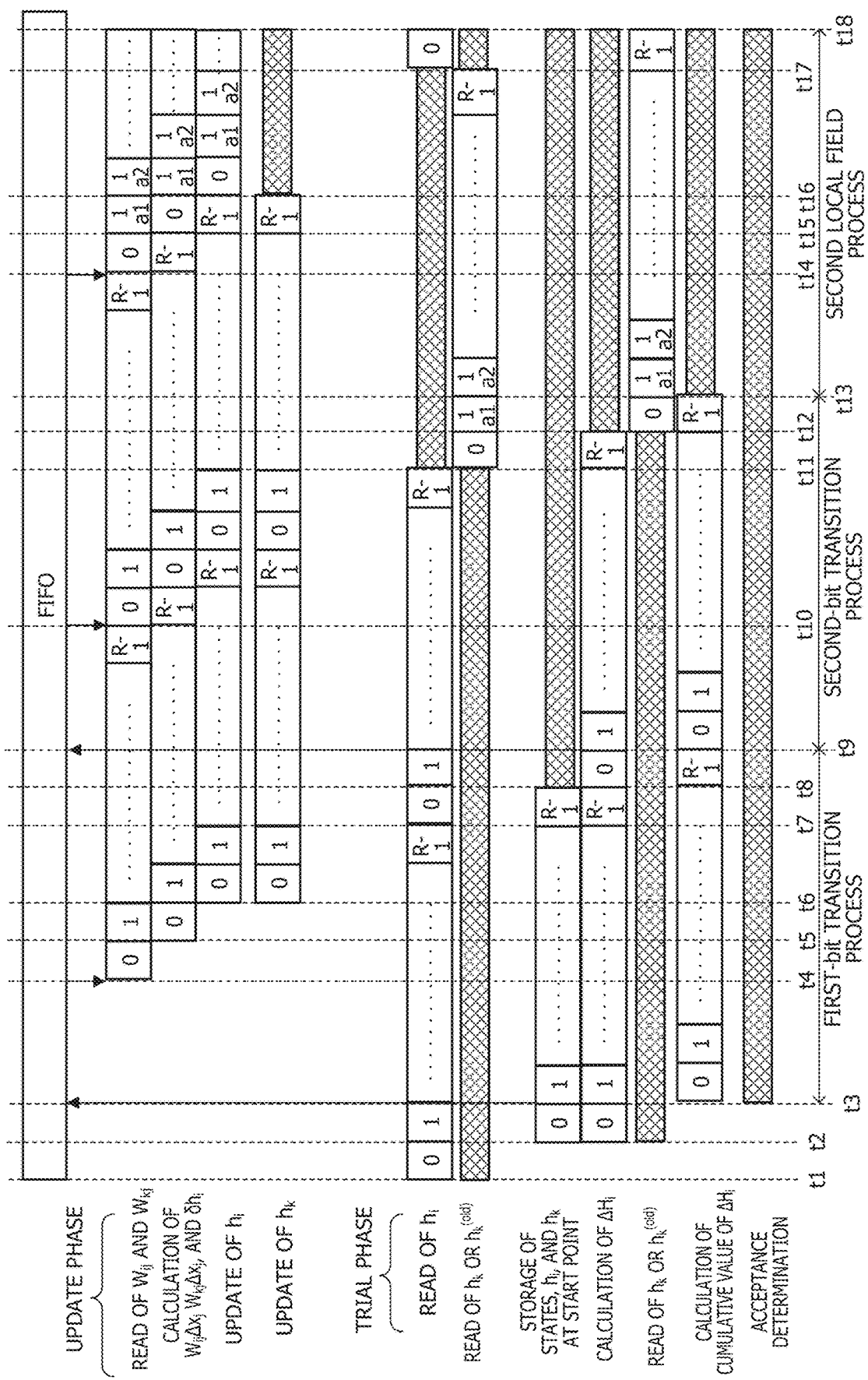
FIG. 10 is a diagram (part 1) illustrating a first example of a pipeline process of the data processing method according to the first embodiment.
Figure 11:
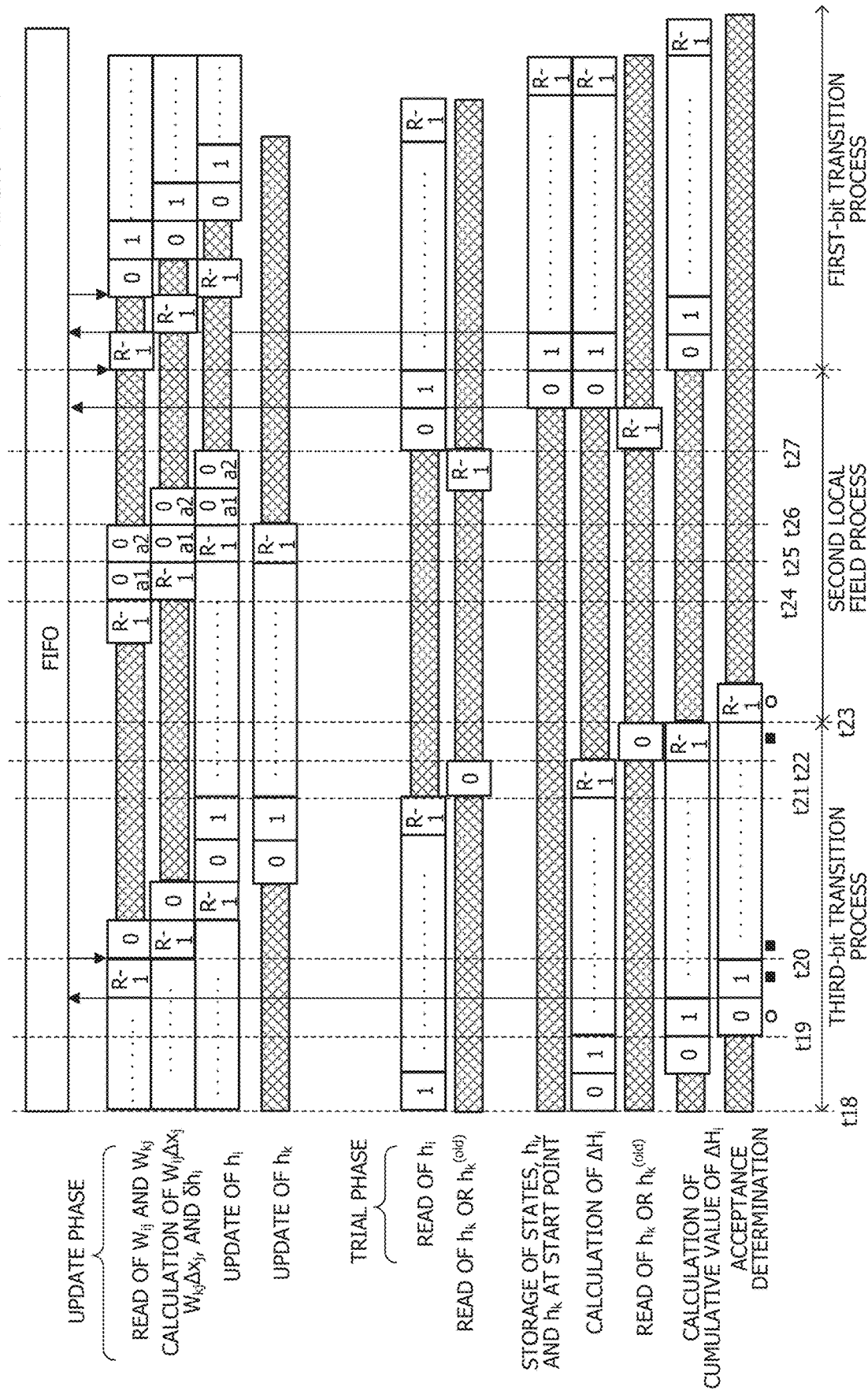
FIG. 11 is a diagram (part 2) illustrating the first example of the pipeline process of the data processing method according to the first embodiment.

FIGS. 10 and 11 are diagrams illustrating a first example of the pipeline process of the data processing method according to the first embodiment. Note that FIGS. 10 and 11 illustrate an example in which the multiple-bit transition process illustrated in FIG. 8 is performed by the pipeline process.

In FIG. 10, expressions 0 to R−1 indicate replica numbers of R replicas. In the example in FIG. 10, trials by multiple-bit transition with a transition bit depth n of three bits are started at the same timing in all the replicas. Note that, since the control circuit 17 can control each replica as an independent process, the start timing of a trial and the value of n may be different among the plurality of replicas. In addition, in the pipeline process, a first-in, first-out (FIFO) is used to adjust operation timings.

Processing performed by each replica is divided into an update phase and a trial phase. The update phase includes read of $W_{ij}$ and $W_{kj}$, calculation of $W_{ij}\Delta x_j$ ($=\Delta h_i$), $W_{kj}\Delta x_j$ ($=\Delta h_k$), and $\delta h_i$, and the update process for $h_i$ and $h_k$. The trial phase includes read of $h_i$ from the memory 12, read of $h_k$ or $h_k^{(old)}$ from the memory 12, storage of the states and $h_i$ and $h_k$ at the start point in the memory 12, calculation of $\Delta H_i$, calculation of the cumulative value of $\Delta H_i$, and acceptance determination based on the cumulative value.

The trial phase for designating a first transition candidate starts from a timing t1. Sequentially for each replica, $h_i$ is read from the memory 12 and held in the $h_i$-holding circuit 14f.

The states and $h_i$ and $h_k$ at the start point are stored in the memory 12 sequentially for each replica from a timing t2. In addition, $\Delta H_i$ is calculated sequentially for each replica from the timing t2.

The cumulative value of $\Delta H_i$ is calculated sequentially for each replica from a timing t3. Note that, in the example in FIG. 10, the acceptance determination based on the cumulative value of $\Delta H_i$ is not performed until the third transition candidate is designated. Note that, although not illustrated, the acceptance determination based on $\Delta H_i$ and the designation of a transition candidate are performed sequentially for each replica from the timing t3. In FIG. 10, processes in a period (timings t3 to t9) in which the first transition candidate is designated for the R replicas are expressed as a first-bit transition process.

When the first transition candidate is designated sequentially for each replica from the timing t3, the identification number of the transition candidate state variable is supplied to the control circuit 17 via the FIFO. Thereafter, the update phase for the first transition candidate starts (timing t4).

The control circuit 17 causes $W_{ij}$ and $W_{kj}$ corresponding to the identification number of the transition candidate to be read from the weighting factor memory 11 sequentially for each replica from the timing t4. Then, $W_{ij}\Delta x_j$ ($=\Delta h_i$) and $W_{kj}\Delta x_j$ ($=\Delta h_k$) are calculated sequentially for each replica from the timing t5. Furthermore, the update process for $h_i$ and $h_k$ is performed sequentially for each replica from the timing t6.

From the timing t7, the trial phase for designating the second transition candidate is started. Sequentially for each replica, $h_i$ is read from the memory 12 and held in the $h_i$-holding circuit 14f.

From the timing t8, $\Delta H_i$ is calculated sequentially for each replica. In addition, the cumulative value of $\Delta H_i$ is calculated sequentially for each replica from the timing t9. In FIG. 10, processes in a period (timings t9 to t13) in which the second transition candidate is designated for the R replicas are expressed as a second-bit transition process.

From the timing t10, the update phase associated with the designation of the second transition candidate is started, and processes similar to the processes at the timings t4 to t6 are performed.

From the timing t11, the update process for the first local fields using the second local fields is performed. From the timing t11, one of $h_k$ and $h_k^{(old)}$ is read from the memory 12 and held in the $h_k$-holding circuit 14g sequentially for each replica. From the timing t12, the other of $h_k$ and $h_k^{(old)}$ is read from the memory 12 and held in the $h_k$-holding circuit 14g sequentially for each replica. In the example in FIG. 10, for the replica with the replica number=1, since the values of two second local fields change, the read is performed in two cycles (a1 and a2). In FIG. 10, processes in a period (timing t13 to t18) in which the values of the second local fields are read for the R replicas are expressed as a second local field process.

From the timing t14, the update phase for the first local fields using the second local fields is performed. $W_{ki}$ corresponding to the identification number=k of $h_k$ changed from the value at the start point is read from the weighting factor memory 11 sequentially for each replica from the timing t14. Then, $\delta h_i$ is calculated sequentially for each replica from the timing t15. Furthermore, the update process for $h_i$ is performed using $\delta h_i$ sequentially for each replica from the timing t16.

From the timing t17, the trial phase for designating the third transition candidate is started, and processes similar to the processes at the timings t8 and t9 are performed. In FIG. 11, processes in a period (timings t18 to t23) in which the third transition candidate is designated for the R replicas are expressed as a third-bit transition process.

From the timing t19, the acceptance determination based on the cumulative value of $\Delta H_i$ is performed. In FIG. 11, the white circle indicates that acceptance is determined to be allowed, and the black rectangle indicates that acceptance is rejected.

In the example in FIG. 11, replicas with the replica numbers=0 and R−1 are determined to be acceptable, and acceptance is rejected for the other replicas. Therefore, the update phase is executed for the replicas with the replica numbers=0 and R−1 (timings t20 to t26). The update phase is not executed for the other replicas, and the states and $h_i$ and $h_k$ at the start point are read and written into the memory 12 as the current states and $h_i$ and $h_k$.

From the timing t21, the update process for the first local fields using the second local fields is performed. For the replicas with the replica numbers=0 and R−1, one of $h_k$ and $h_k^{(old)}$ is read from the memory 12 and held in the $h_k$-holding circuit 14g at the processing timing of each replica. From the timing t22, for the replicas with the replica numbers=0 and R−1, the other of $h_k$ and $h_k^{(old)}$ is read from the memory 12 and held in the $h_k$-holding circuit 14g at the processing timing of each replica.

From the timing t24, the update phase for the first local fields using the second local fields is performed. For the replicas with the replica numbers=0 and R−1, $W_{ki}$ corresponding to the identification number=k of $h_k$ changed from the value at the start point is read from the weighting factor memory 11 at the processing timing of each replica from the timing t24. Then, $\delta h_i$ is calculated for these replicas from the timing t25. Furthermore, from the timing t26, the update process for $h_i$ is performed on these replicas, using $\delta h_i$. Note that, for the other replicas, $h_i$ and $h_k$ are updated using $h_i$ and $h_k$ at the start point.

Thereafter, from a timing t27, the trial phase for designating the first transition candidate is started again, and processes similar to the processes from the timing t1 are performed.

In a case where the pipeline process as described above is performed, for example, a state indicating a minimum value among the values of the evaluation function obtained while the process for each replica is repeated a predetermined number of trials is output as a solution. Note that the above pipeline process can also be applied to a solution search using the simulated annealing method and can also be applied to a solution search using a replica exchange method.

The control circuit 17 controls a plurality of different replicas so as to perform different processes in the same period by the pipeline process, thereby enabling to process the plurality of replicas simultaneously in parallel.

As illustrated in FIGS. 10 and 11, one step of each replica process (each process of the trial phase+update phase) is in the same period for all the processes (the first-bit transition process, the second-bit transition process, and the third-bit transition process) that each change the value of one transition candidate. This may enable to conceal a delay in the pipeline of each replica process.

Figure 12:
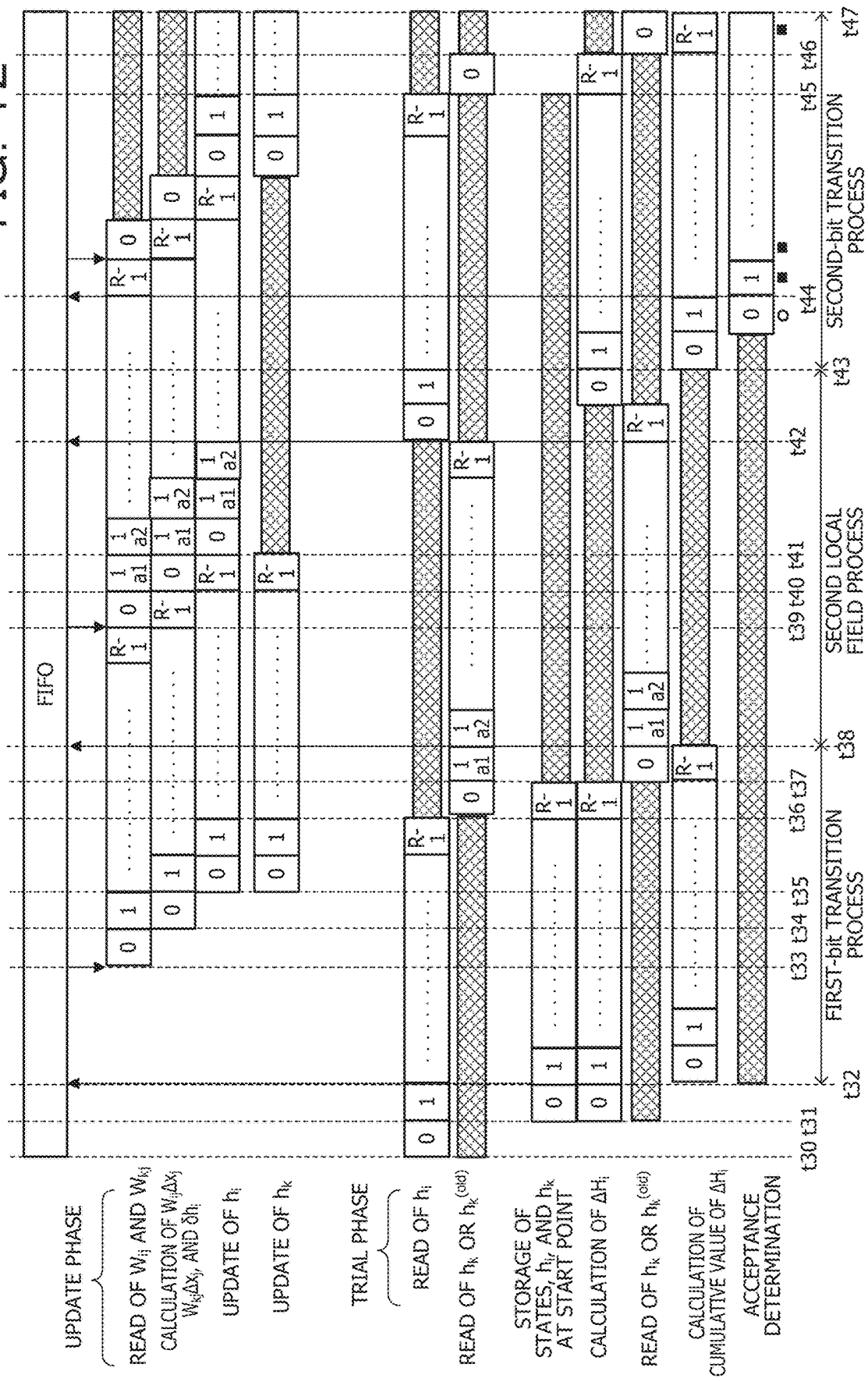
FIG. 12 is a diagram (part 1) illustrating a second example of the pipeline process of the data processing method according to the first embodiment.
Figure 13:
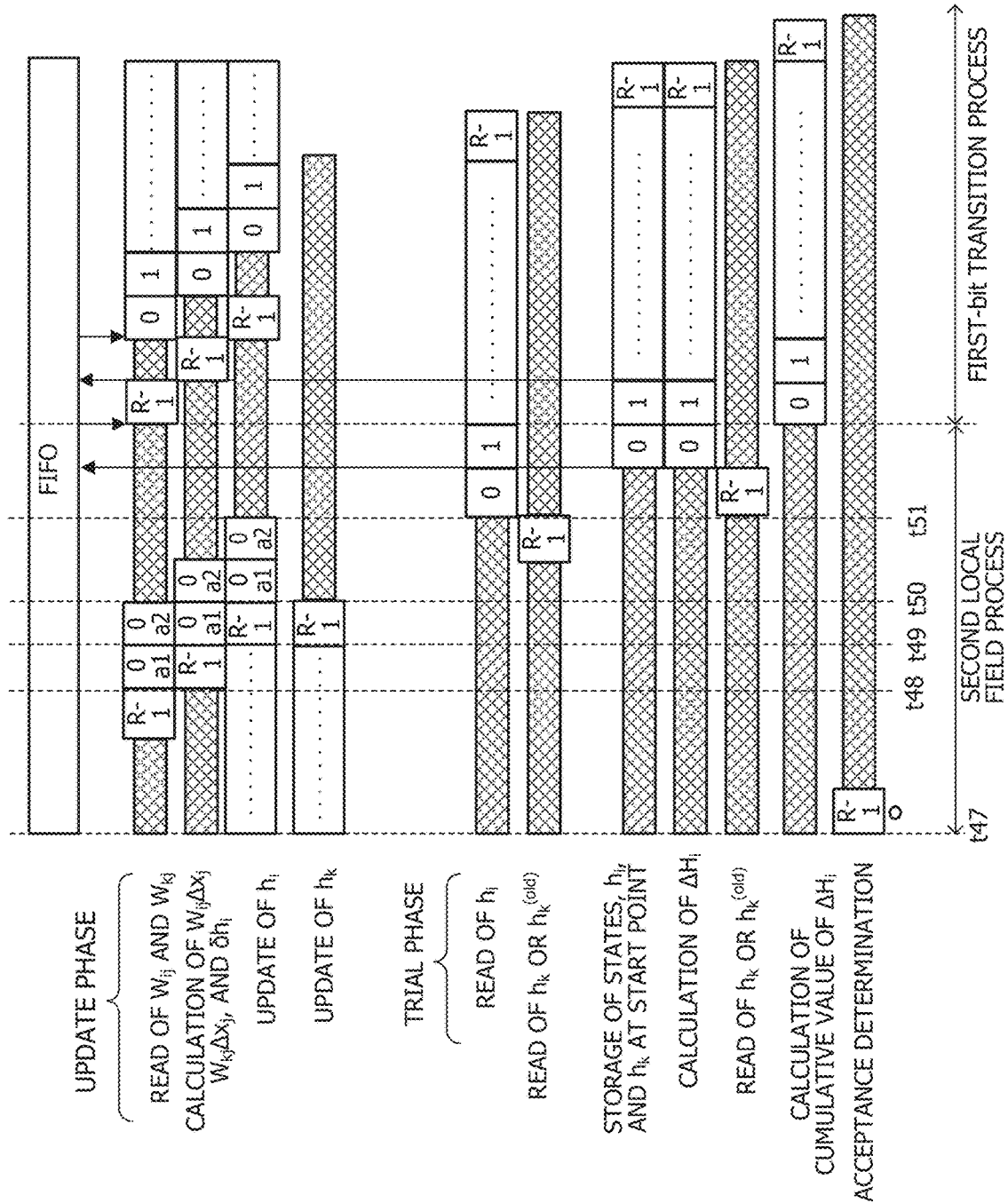
FIG. 13 is a diagram (part 2) illustrating the second example of the pipeline process of the data processing method according to the first embodiment.

FIGS. 12 and 13 are diagrams illustrating a second example of the pipeline process of the data processing method according to the first embodiment. Note that FIGS. 12 and 13 illustrate an example in which the multiple-bit transition process illustrated in FIG. 9 is performed by the pipeline process.

Processes from a timing t30 to a timing t36 are the same as the processes from the timing t1 to the timing t7 illustrated in FIG. 10.

From the timing t36, the update process for the first local fields using the second local fields is performed. Processes from the timing t36 to one cycle before a timing t43 are the same as the processes from the timing t11 to the timing t18 illustrated in FIGS. 10 and 11.

Processes from one cycle before the timing t43 to a timing t47 are the same as the processes from the timing t19 to the timing t23 illustrated in FIG. 11.

Processes from the timing t47 to a timing t51 are the same as the processes from the timing t23 to the timing t27 illustrated in FIG. 11.

The processes in FIGS. 12 and 13 are to reflect a difference from the value of the second local field at the start point in the first local field every time the transition candidate is designated.

Note that, after the determination as to whether or not to accept the transition of the n transition candidates, since the above difference of the second local field does not have to be reflected in the first local field except the accepted replicas, the pipeline process period may be shortened.

According to the data processing device 10 and the data processing method of the first embodiment as described above, the states and the values of the first and second local fields at the first time point (the start point in the above example) are stored. Then, the values of the transition candidates designated one by one from that time point are changed to update the first and second local fields, and whether or not to accept changes in the values of these transition candidates is determined based on the cumulative value of $\Delta H_i$. Even if the state and the values of the first and second local fields have been updated based on a change in the value of the transition candidate, the state and the values of the first and second local fields return to the state and the values of the first and second local fields at the first time point described above stored in advance, at the time of rejection of the acceptance described above. In this manner, a complicated propagation mechanism or the like for the local fields to achieve multiple-bit transition is no longer involved. This may enable to promote the independence of arithmetic units for each bit, whereby the circuit configuration is simplified, and it becomes easy to implement the multiple-bit transition process. This may also enable large-scale parallelization. Furthermore, even when the number (n) of transition candidates is changed, processing may be performed with the same circuit, and accordingly, the degree of freedom in search may be high.

In addition, since the single-bit transition process and the multiple-bit transition process may be achieved with the same circuit, it may be easy to switch the operation mode.

Furthermore, the pipeline process using a plurality of replicas as illustrated in FIGS. 10 to 13 may also be achieved without complicating the circuit configuration, and high performance may be expected.

In addition, according to the data processing device 10 and the data processing method of the first embodiment, the second local field used to specify the constraint violation amount added to the value of the evaluation function when the constraint condition is not satisfied is used. For the second local field, the value at the first time point is stored in the memory 12 as described above. In addition, the second local field is updated every time the transition candidate is designated. Then, at the second time point, the value of the first local field is further updated using the value of the second local field at the first time point and the value of the second local field at the second time point. In addition, in a case where it is determined not to accept changes in the values of the n transition candidates, the values of the second local fields are returned to the values at the first time point. This may allow the multiple-bit transition process as described above to be applied to a combinatorial optimization problem with a constraint condition.

In addition, for example, as illustrated in FIGS. 9 to 11, the data processing device 10 may assign the timing of updating the first local fields using the values of the second local fields at the first time point and the second time point, as the time point at which a plurality of transition candidates is designated (in the above example, the time point at which n−1 transition candidates are designated). This may allow the changes in the second local fields to be collectively reflected, as compared with a case where the change in the second local field is reflected in the first local field at each time, and accordingly, may reduce the number of arithmetic operations.

Such a data processing device 10 may be expected to be useful as a technique for obtaining an accurate solution at high speed, when solving diverse problems in modern society that can be transformed into a combinatorial optimization problem with a constraint condition.

Second Embodiment

A data processing device according to a second embodiment to be described below divides N state variables into a plurality of state variable groups to execute designation and an update process for n transition candidates, calculation of a cumulative value, and the like in parallel for each state variable group, with a plurality of modules. Note that an example in which N state variables are divided into three state variable groups and processes are performed by three modules will be described below, but these numbers are not restrictive.

Figure 14:
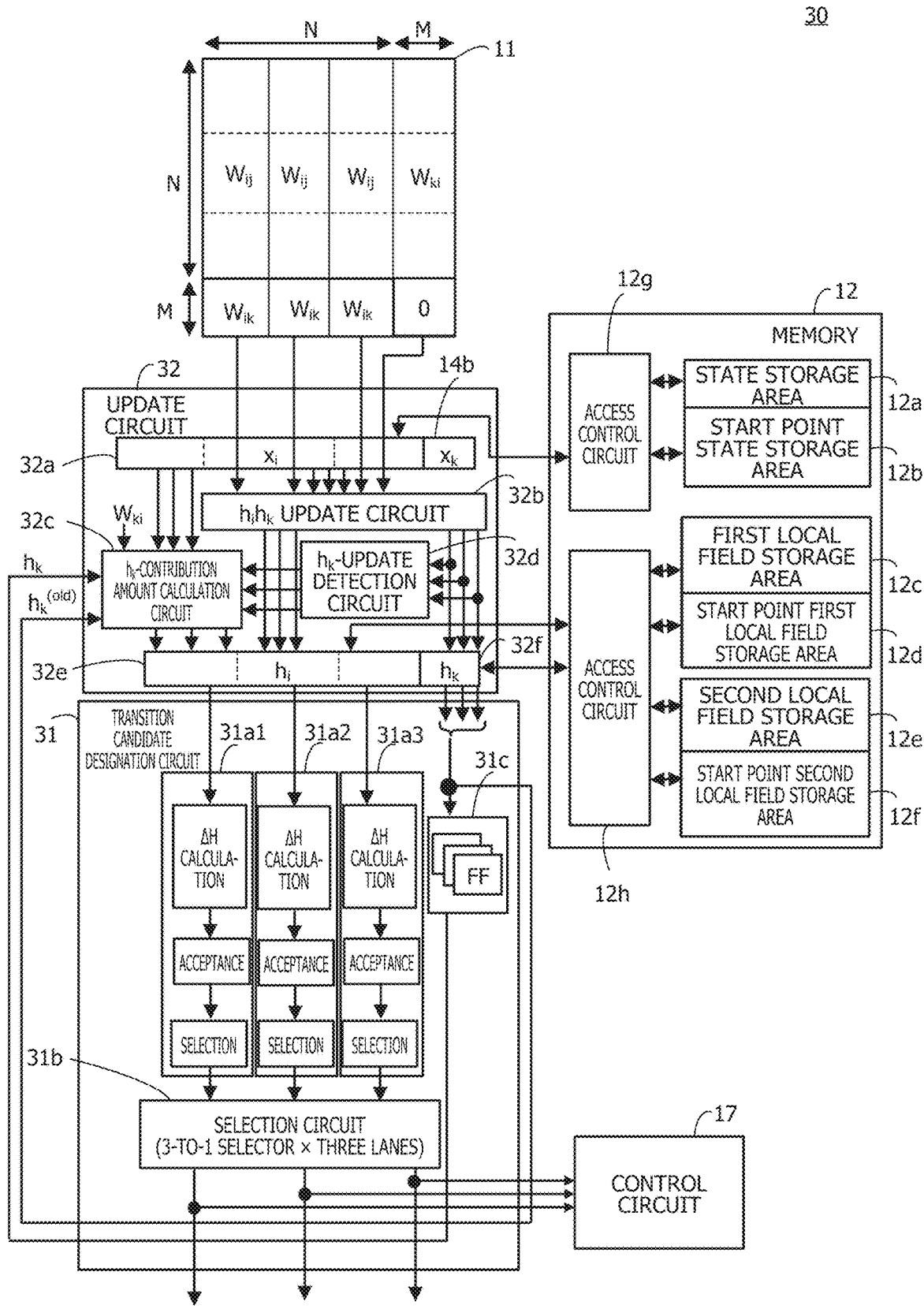
FIG. 14 is a diagram (part 1) illustrating an example of a data processing device according to a second embodiment.
Figure 15:
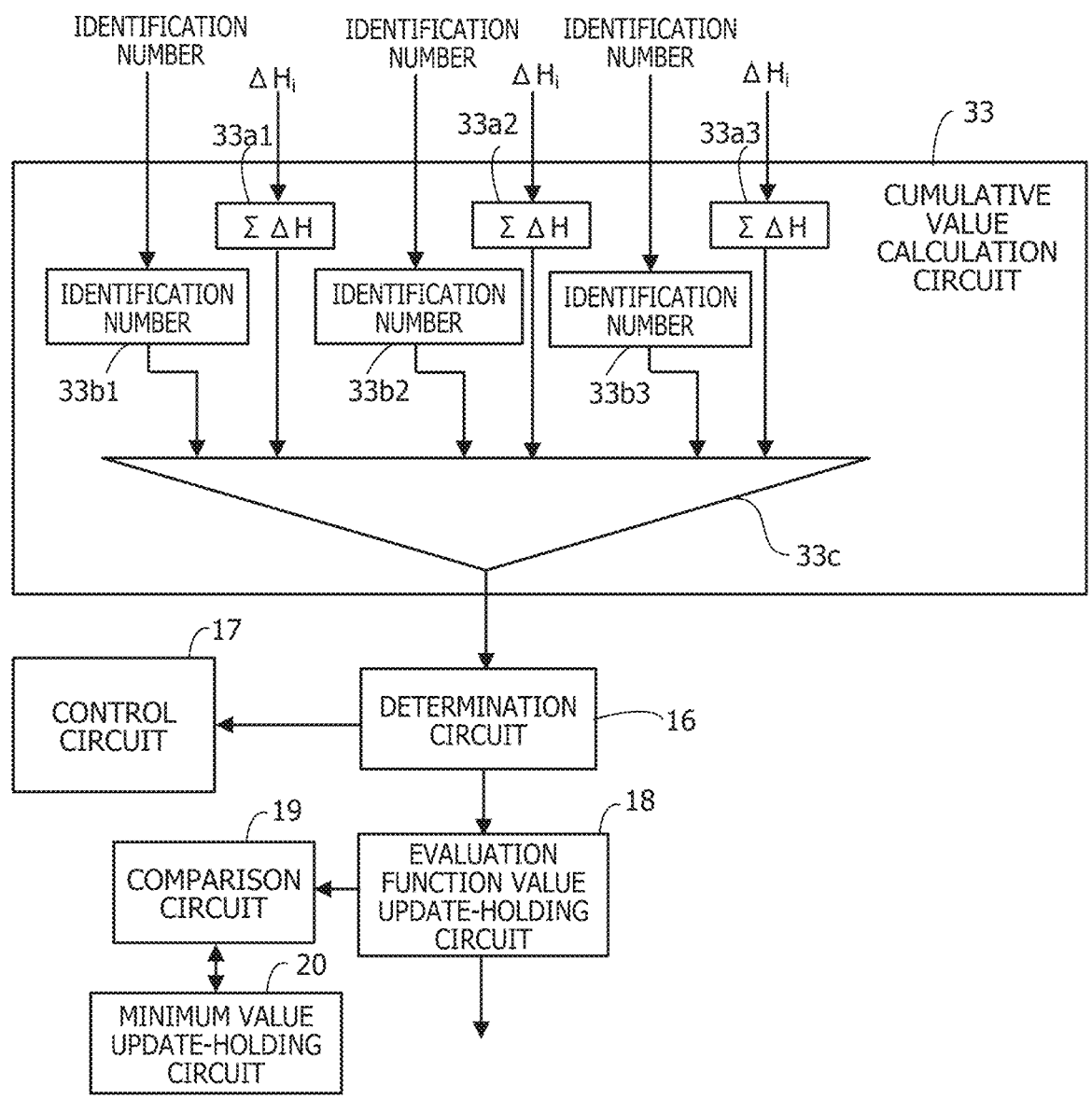
FIG. 15 is a diagram (part 2) illustrating an example of the data processing device according to the second embodiment.

FIGS. 14 and 15 are diagrams illustrating an example of the data processing device according to the second embodiment. In FIGS. 14 and 15, the same elements as the elements illustrated in FIGS. 3 and 5 will be given the same reference signs.

In a data processing device 30 of the second embodiment, a transition candidate designation circuit 31 includes modules 31a1, 31a2, and 31a3. The modules 31a1 to 31a3 designate n transition candidates one by one within ranges of mutually different state variable groups among $x_1$ to $x_N$.

For example, the module 31a1 handles a state variable group of $x_1$ to $x_{k-1}$, the module 31a2 handles a state variable group of $x_k$ to $x_{l-1}$, and the module 31a3 handles a state variable group of $x_1$ to $x_N$.

Each of the modules 31a1 to 31a3 is provided with a $\Delta H$ calculation circuit 13a, a $\Delta H$ holding circuit 13b, an acceptance determination circuit 13d, and a selection circuit 13e illustrated in FIG. 5. In FIG. 14, the $\Delta H$ calculation circuit 13a and the $\Delta H$ holding circuit 13b are collectively expressed as "$\Delta H$ calculation", the acceptance determination circuit 13d is expressed as "acceptance", and the selection circuit 13e is expressed as "selection".

The transition candidate designation circuit 31 further includes a selection circuit 31b and an FF unit 31c. Under the control of a control circuit 17, the selection circuit 31b supplies $\Delta H_i$ due to changes in the values of the transition candidates output from the modules 31a1 to 31a3 to any one of calculation circuits 33a1, 33a2, and 33a3 for the cumulative values for the modules 31a1 to 31a3. The identification numbers of the transition candidates are also similarly selected and supplied to any one of holding circuits 33b1, 33b2, and 33b3 for the modules 31a1 to 31a3. The FF unit 31c includes FFs 13c illustrated in FIG. 5 as many as the number of modules 31a1 to 31a3, namely, three FFs. This allows three instances of $h_k^{(old)}$ to be output in parallel.

The identification numbers and $\Delta H_i$ of the first transition candidate output from each of the modules 31a1 to 31a3 may be supplied to one of the calculation circuits 33a1 to 33a3 and one of the holding circuits 33b1 to 33b3 for any module. The identification numbers and $\Delta H_i$ of the second and subsequent transition candidates output from each of the modules 31a1 to 31a3 are supplied to the calculation circuits 33a1 to 33a3 and the holding circuits 33b1 to 33b3 for the corresponding modules, respectively.

As the selection circuit 31b that performs such selection, for example, a 3-to-1 selector with three lanes can be used.

In an update circuit 32, a state update-holding circuit 32a holds three state variable groups. The three state variable groups are obtained by dividing the values of the N state variables into three. The state update-holding circuit 32a can update the values of the state variables selected from each state variable group by the selection circuit 31b in parallel under the control of the control circuit 17. In addition, the state update-holding circuit 32a can output $\Delta x_j$ in parallel from each of three holding areas holding the values of the three state variable groups.

In addition, in the update circuit 32, an $h_i h_k$ update circuit 32b updates the values of the first local fields ($h_i$) and the second local fields ($h_k$) in association with changes in the values of the three state variables selected by the selection circuit 31b under the control of the control circuit 17. For example, in a case where $x_j$ is a transition candidate, $h_i$ is updated to a value of $h_i = h_i + W_{ij}\Delta x_j$. In addition, in a case where $x_j$ is designated as a transition candidate, $h_k$ is updated to a value of $h_k = h_k + W_{kj}\Delta x_j$.

An $h_k$-update detection circuit 32d detects update of three sets of $h_k$ associated with a change in the value of $x_j$ in each of the three state variable groups. In a case of $W_{kj}=0$, no update of $h_k$ regarding the constraint condition with the identification number=k is detected.

An $h_k$-contribution amount calculation circuit 32c reads, from a weighting factor memory 11, non-zero $W_{ki}$ used to calculate an amount of change in $h_i$ ($\delta h_i$) due to a change in the value of $h_k$ whose update has been detected, in the three sets of $h_k$. Furthermore, the $h_k$-contribution amount calculation circuit 32c acquires three sets of $h_k$ from an $h_k$-holding circuit 32f and acquires $h_k^{(old)}$ from the FF unit 31c. Then, the $h_k$-contribution amount calculation circuit 32c calculates $\delta h_i$ associated with each of changes in the three sets of $h_k$ and updates $h_i$ by adding $\delta h_i$ to $h_i$ included in first local field groups corresponding to each set.

An $h_i$-holding circuit 32e holds N instances of $h_i$ by dividing the N instances of $h_i$ into three corresponding to three state variable groups. The N/3 instances of $h_i$ included in each of the three first local field groups are updated using the change amount ($\Delta x_j$) of $x_j$ selected from the corresponding state variable group.

The $h_k$-holding circuit 32f holds three sets of M instances of $h_k$ in correspondence with the three modules 31a1 to 31a3.

A cumulative value calculation circuit 33 in FIG. 15 includes the calculation circuits 33a1 to 33a3 that calculate cumulative values of $\Delta H_i$ (expressed as "$\Sigma \Delta H$") for each of the modules 31a1 to 31a3. Furthermore, the cumulative value calculation circuit 33 includes the holding circuits 33b1 to 33b3 that hold the identification numbers of n transition candidates for each of the modules 31a1 to 31a3, and a selection circuit 33c.

The selection circuit 33c selects one of three cumulative values of $\Delta H_i$. For example, the selection circuit 33c selects a cumulative value of $\Delta H_i$ that minimizes the value of the evaluation function. The selection circuit 33c outputs the selected cumulative value and indexes of the n transition candidates corresponding to the selected cumulative value together.

Based on the selected cumulative value, a determination circuit 16 determines whether or not to accept changes in the values of the n transition candidates corresponding to the selected cumulative value.

Next, a flow of a data processing method (solution search) by the data processing device 30 of the second embodiment will be described with reference to a flowchart.

Since the flows of the entire process and the single-bit transition process are similar to the flows of the processes illustrated in FIGS. 6 and 7, description will be omitted.

Figure 16:
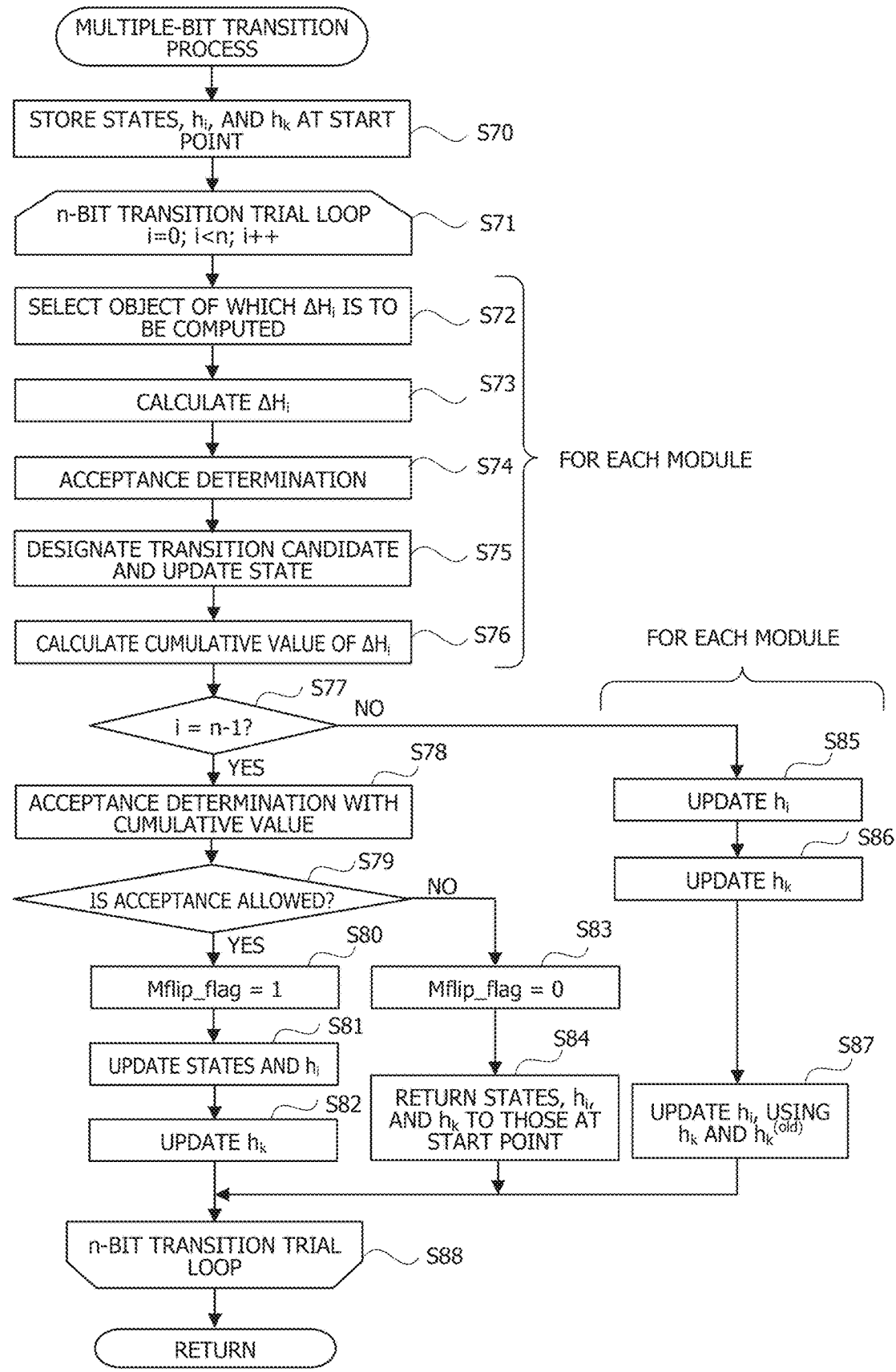
FIG. 16 is a flowchart illustrating a flow of an example of a multiple-bit transition process of a data processing method according to the second embodiment.

FIG. 16 is a flowchart illustrating a flow of an example of a multiple-bit transition process of the data processing method according to the second embodiment.

Processes in steps S70 to S88 in FIG. 16 are substantially similar to the processes in steps S30 to S48 illustrated in FIG. 8.

However, the processes in steps S72 to S76 and steps S85 to S87 are performed for each module. In addition, in the process in step S78, the determination circuit 16 uses one cumulative value selected from among the three cumulative values of $\Delta H_i$ by the selection circuit 33c to determine whether or not to accept changes in the values of the n transition candidates corresponding to the one cumulative value.

Furthermore, in the process in step S81, first, a process of returning the states and the values of the first local fields related to each module to the stored states and values of the first local fields at the start point is performed. This is because the held states and first local fields are different for each module. Thereafter, the control circuit 17 causes the update circuit 32 to update the states and the values of the first local fields related to each module, based on the identification numbers of the n transition candidates held in any one of the holding circuits 33b1 to 33b3.

In the process in step S82, the values of the second local fields held in correspondence with the other modules are also updated so as to match the values of the second auxiliary variables ($h_k$) held in correspondence with the module that has output the selected cumulative value.

In addition, in the process in step S84, the control circuit 17 returns the values of the N/3 state variables, the values of the N/3 first local fields, and the values of the M second local fields held in correspondence with each of the three modules 31a1 to 31a3 to the stored values at the start point.

Figure 17:
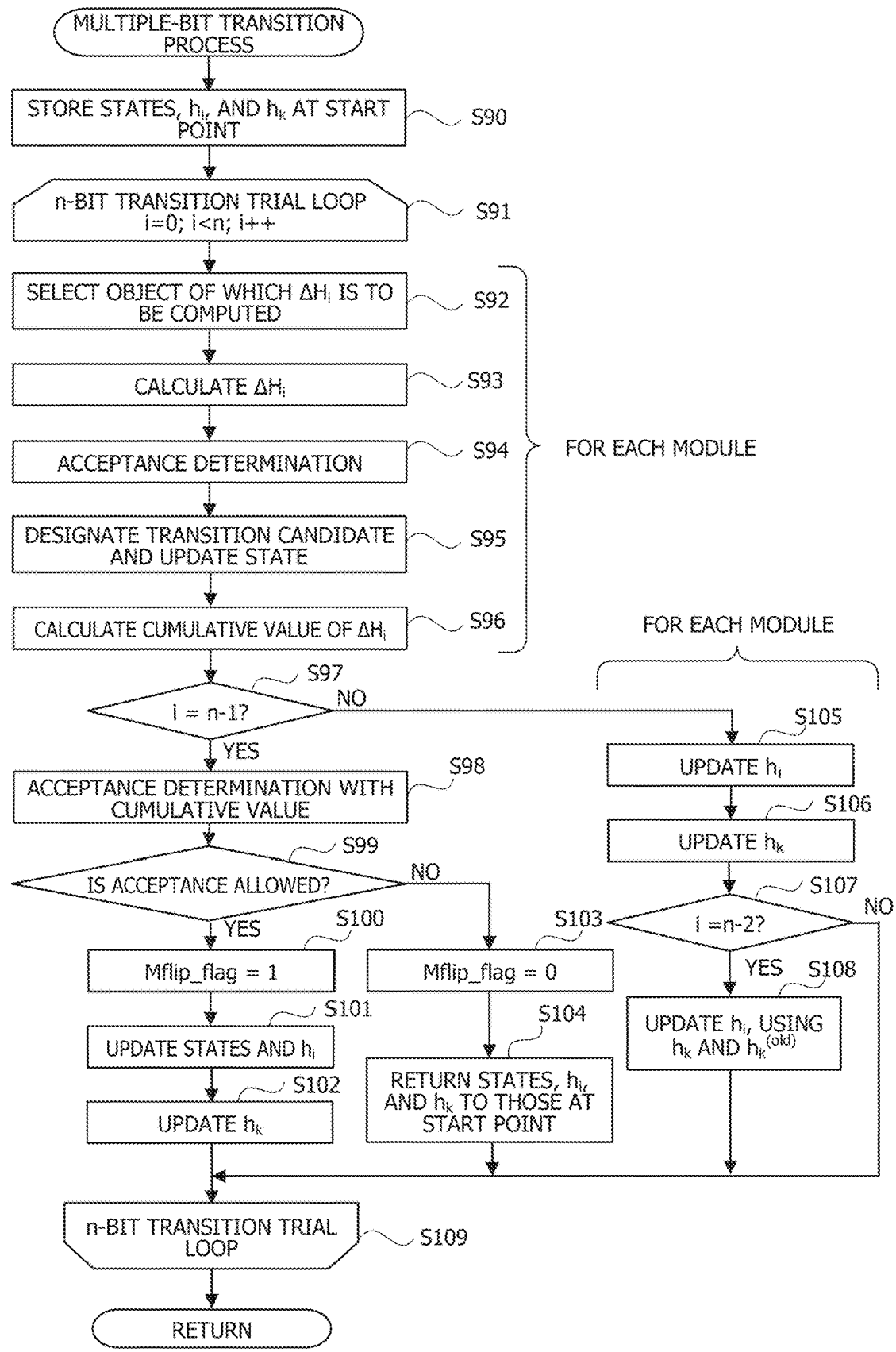
FIG. 17 is a flowchart illustrating a flow of another example of the multiple-bit transition process of the data processing method according to the second embodiment.

FIG. 17 is a flowchart illustrating a flow of another example of the multiple-bit transition process of the data processing method according to the second embodiment.

Processes in steps S90 to S109 in FIG. 17 are substantially similar to the processes in steps S50 to S69 illustrated in FIG. 9.

However, the processes in steps S92 to S96 and steps S105 to S108 are performed for each module. In addition, in the process in step S98, the determination circuit 16 uses one cumulative value selected from among the three cumulative values of $\Delta H_i$ by the selection circuit 33c to determine whether or not to accept changes in the values of the n transition candidates corresponding to the one cumulative value.

Furthermore, in the process in step S101, first, a process of returning the states and the values of the first local fields related to each module to the stored states and values of the first local fields at the start point is performed. Thereafter, the control circuit 17 causes the update circuit 32 to update the states and the values of the first local fields related to each module, based on the identification numbers of the n transition candidates held in any one of the holding circuits 33b1 to 33b3.

In the process in step S102, the values of the second local fields held in correspondence with the other modules are also updated so as to match the values of the second local fields ($h_k$) held in correspondence with the module that has output the selected cumulative value.

In addition, in the process in step S104, the control circuit 17 returns the values of the N/3 state variables, the values of the N/3 first local fields, and the values of the M second local fields held in correspondence with each of the three modules 31a1 to 31a3 to the stored values at the start point.

Note that the order of the processes illustrated in FIGS. 16 and 17 is an example, and the order of the processes may be altered as appropriate.

(Example of Pipeline Process)

Similarly to the data processing of the data processing device 10 of the first embodiment, the above processes can also be performed for a plurality of replicas of the Ising model in parallel, using a pipeline process. The memory 12 stores the values of the N state variables, the values of the N first local fields, and the values of the M second local fields related to each module by an amount equal to the number of the plurality of replicas. In addition, the memory 12 may also store the values of the N state variables, the values of the N first local fields, and the values of the M second local fields at the start point by an amount equal to the number of the plurality of replicas, or may store the values common to all the replicas. In that case, however, in order to hinder the plurality of replicas from simultaneously using the memory 12, control is performed such that the multiple-bit transition process is not activated in other than one replica in the pipeline process. $W_{ij}$, $W_{ki}$, and $W_{ik}$ stored in the weighting factor memory 11 are common to all the replicas.

The control circuit 17 causes the transition candidate designation circuit 31, the update circuit 32, the cumulative value calculation circuit 33, and the determination circuit 16 to perform the pipeline process for the plurality of replicas. Note that the control circuit 17 may control such that the single-bit transition process is performed for some replicas.

Figure 18:
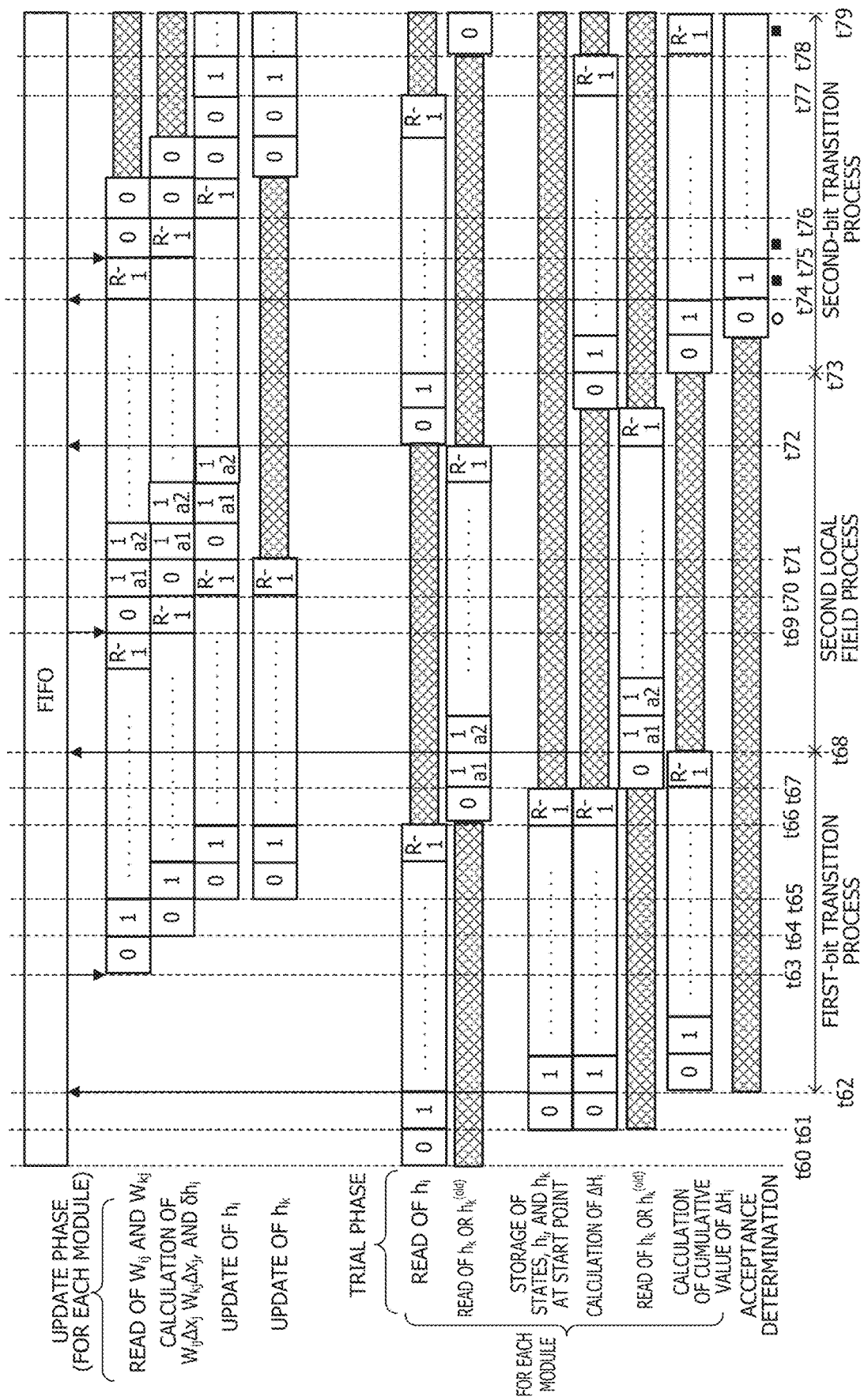
FIG. 18 is a diagram (part 1) illustrating an example of a pipeline process of the data processing method according to the second embodiment.
Figure 19:
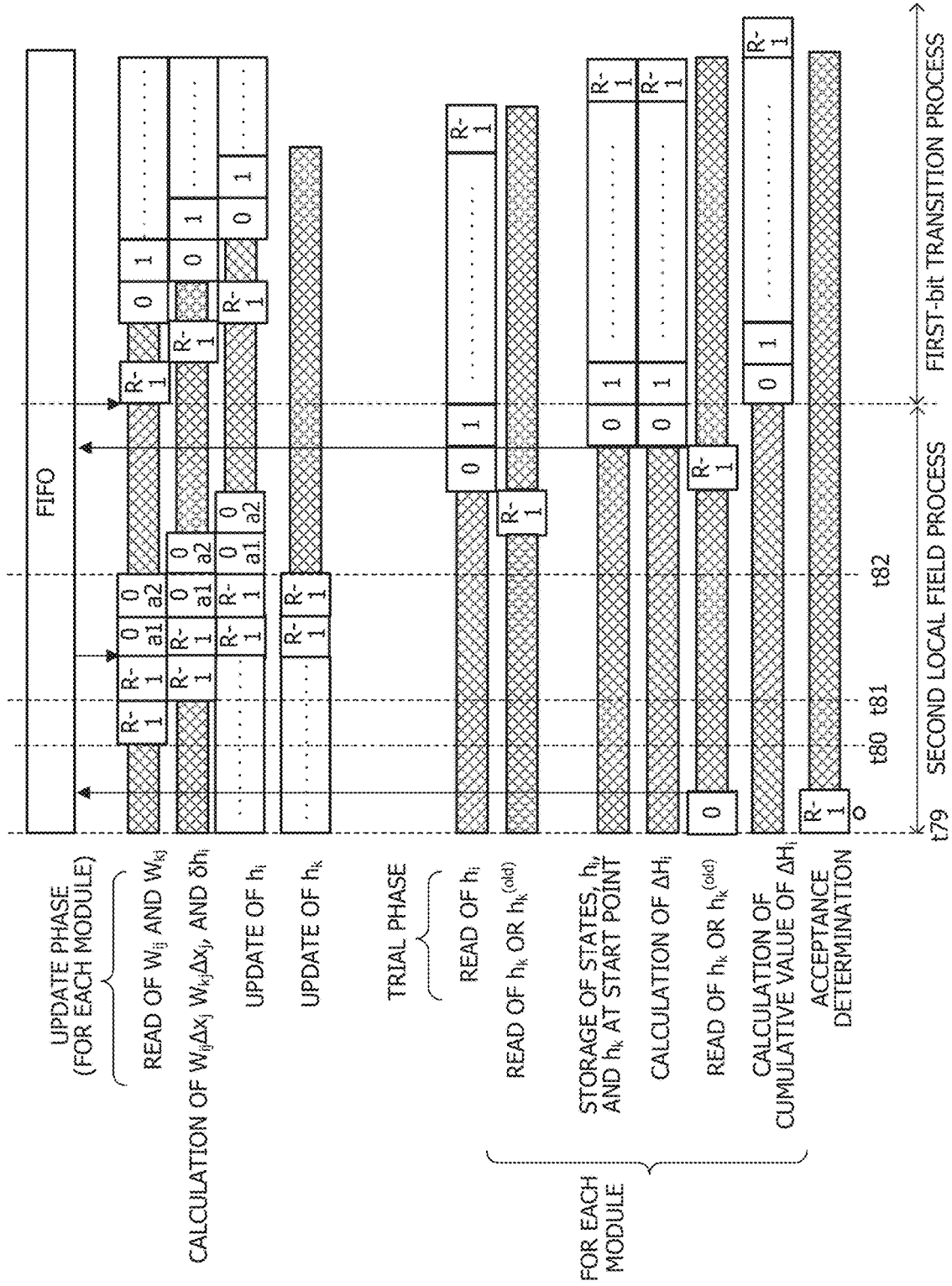
FIG. 19 is a diagram (part 2) illustrating an example of the pipeline process of the data processing method according to the second embodiment.

FIGS. 18 and 19 are diagrams illustrating an example of the pipeline process of the data processing method according to the second embodiment. Note that FIGS. 18 and 19 illustrate an example in which the multiple-bit transition process illustrated in FIG. 16 is performed by the pipeline process. The multiple-bit transition process illustrated in FIG. 17 can also be performed by the pipeline process. Hereinafter, differences from the timing chart illustrated in FIG. 12 will be mainly described.

Each process of the update phase is performed for each module. In the trial phase, other than the acceptance determination based on the cumulative value by the determination circuit 16 is performed for each module.

The processes from a timing t60 to a timing t74 are similar to the processes from the timing t30 to the timing t44 illustrated in FIG. 12 except that the above-described processes are performed for each module. At timings t75 and t76, in the process in step S81 illustrated in FIG. 16, a process of returning the states and the values of the first local fields of the replica with the replica number=0 related to each module to the stored states and values of the first local fields at the start point is performed. At timings t76 and t77, the update process for the states and the values of the first local fields related to each module in the process in step S81 illustrated in FIG. 16 and the process corresponding to the process in step S82 are performed.

By such processes, a standby time occurs between the timing t77 and, for example, the start timing (timing t78) of read of $h_k$ or $h_k^{(old)}$ to be used to update the first local fields using the second local fields. Note that the control circuit 17 may reduce the standby time by varying the processing cycle, for example.

The second-bit transition process finishes at a timing t79. Thereafter, at timings t80 and t81, in the process in step S81 illustrated in FIG. 16, a process of returning the states and the values of the first local fields of the replica with the replica number=R−1 related to each module to the stored states and values of the first local fields at the start point is performed. At timings t81 and t82, the update process for the states and the values of the first local fields related to each module in the process in step S81 illustrated in FIG. 16 and the process corresponding to the process in step S82 are performed.

According to the data processing device 30 and the data processing method of the second embodiment as described above, an effect similar to the effect of the data processing device 10 and the data processing method of the first embodiment may be obtained. Furthermore, since the data processing device 30 of the second embodiment can perform parallel processing by a plurality of modules, a solution search may be performed more efficiently. As described earlier, in the data processing device 10 of the first embodiment, the circuit configuration for achieving the multiple-bit transition process may be simplified. Therefore, even with a configuration in which parallel search using a plurality of modules is performed as in the data processing device 30 of the second embodiment, the circuit configuration may be restrained from becoming complicated.

(Hardware Configuration Example)

Figure 20:
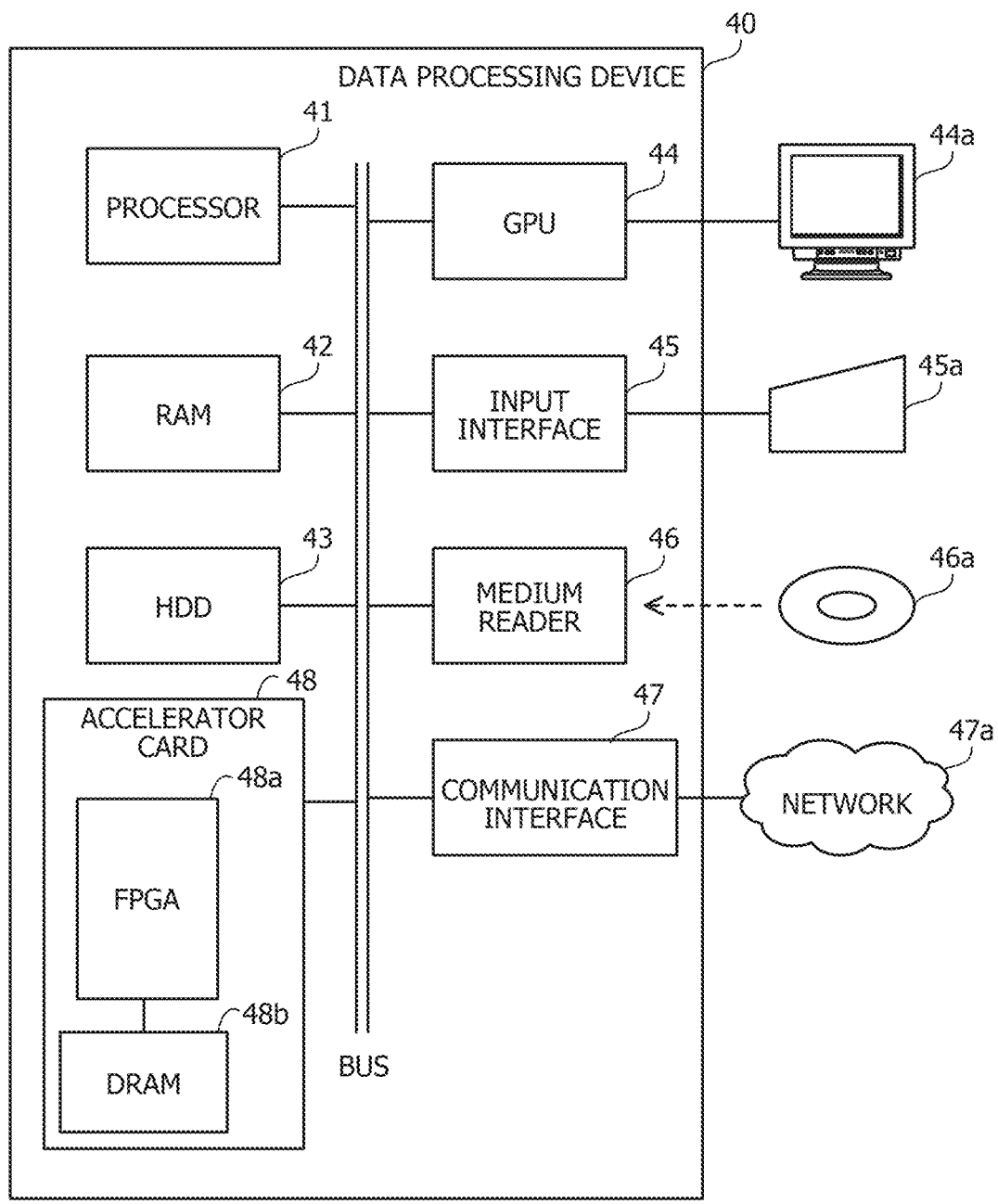
FIG. 20 is a diagram illustrating a hardware example of an example of the data processing device.

FIG. 20 is a diagram illustrating a hardware example of an example of the data processing device.

A data processing device 40 is, for example, a computer and includes a processor 41, a random access memory (RAM) 42, an HDD 43, a GPU 44, an input interface 45, a medium reader 46, a communication interface 47, and an accelerator card 48. The units mentioned above are coupled to a bus.

The processor 41 loads at least a part of a program and data stored in the HDD 43 into the RAM 42 and executes the program. Note that the processor 41 may include a plurality of processor cores, for example. In addition, the data processing device 40 may include a plurality of processors. Note that a set of the plurality of processors (multiprocessor) may be called a "processor". As the processor 41, a CPU, a GPU, a DSP, or the like can be used.

The RAM 42 is a volatile semiconductor memory that temporarily stores a program to be executed by the processor 41 and data to be used by the processor 41 for arithmetic operations. Note that the data processing device 40 may include a memory of a type other than the RAM 42 or may include a plurality of memories.

The HDD 43 is a nonvolatile storage device that stores software programs such as an operating system (OS), middleware, and application software, and data. The programs include, for example, a program for causing the data processing device 40 to execute a process of searching for a solution in combinatorial optimization. Note that the data processing device 40 may include another type of storage device such as a flash memory or a solid state drive (SSD) or may include a plurality of nonvolatile storage devices.

The GPU 44 outputs an image to a display 44a coupled to the data processing device 40 in accordance with a command from the processor 41. As the display 44a, a cathode ray tube (CRT) display, a liquid crystal display (LCD), a plasma display panel (PDP), an organic electro-luminescence (OEL) display, or the like can be used.

The input interface 45 acquires input signals from an input device 45a coupled to the data processing device 40 and outputs the acquired input signals to the processor 41. As the input device 45a, a pointing device such as a mouse, a touch panel, a touch pad, or a trackball, a keyboard, a remote controller, a button switch, or the like can be used. In addition, a plurality of types of input devices may be coupled to the data processing device 40.

The medium reader 46 is a reading device that reads programs and data recorded on a recording medium 46a. As the recording medium 46a, for example, a magnetic disk, an optical disc, a magneto-optical disk (MO), a semiconductor memory, or the like can be used. The magnetic disk includes a flexible disk (FD) and an HDD. The optical disc includes a compact disc (CD) and a digital versatile disc (DVD).

The medium reader 46 copies, for example, a program and data read from the recording medium 46a to another recording medium such as the RAM 42 or the HDD 43. The read program is executed by the processor 41, for example. Note that the recording medium 46a may be a portable recording medium and is sometimes used for distribution of a program and data. In addition, the recording medium 46a or the HDD 43 will be sometimes referred to as a computer-readable recording medium.

The communication interface 47 is an interface that is coupled to a network 47a and communicates with other information processing devices via the network 47a. The communication interface 47 may be a wired communication interface coupled to a communication device such as a switch by a cable or a wireless communication interface coupled to a base station by a wireless link.

The accelerator card 48 is a hardware accelerator that searches for a solution to a combinatorial optimization problem. The accelerator card 48 includes an FPGA 48a and a DRAM 48b.

Each element illustrated in FIGS. 3, 14, and 15 can be formed by the FPGA 48a and the DRAM 48b. For example, the weighting factor memory 11 is formed by the DRAM 48b, and the other circuits and the memory 12 can be formed by the FPGA 48a.

Note that there may be a plurality of the accelerator cards 48.

In addition, the processing details described above (such as FIGS. 6 to 9, 16, and 17, for example) performed by the data processing devices 10 and 30 can be achieved by software causing a computer to execute a program.

The program can be recorded in a computer-readable recording medium. As the recording medium, a magnetic disk, an optical disc, a magneto-optical disk, a semiconductor memory, or the like can be used, for example. The magnetic disk includes a flexible disk and an HDD. The optical disc includes a CD, a CD-recordable (R)/rewritable (RW), a DVD, and a DVD-R/RW. The program is sometimes recorded in a portable recording medium and distributed. In that case, the program may be copied from the portable recording medium to another recording medium before execution.

Figure 21:
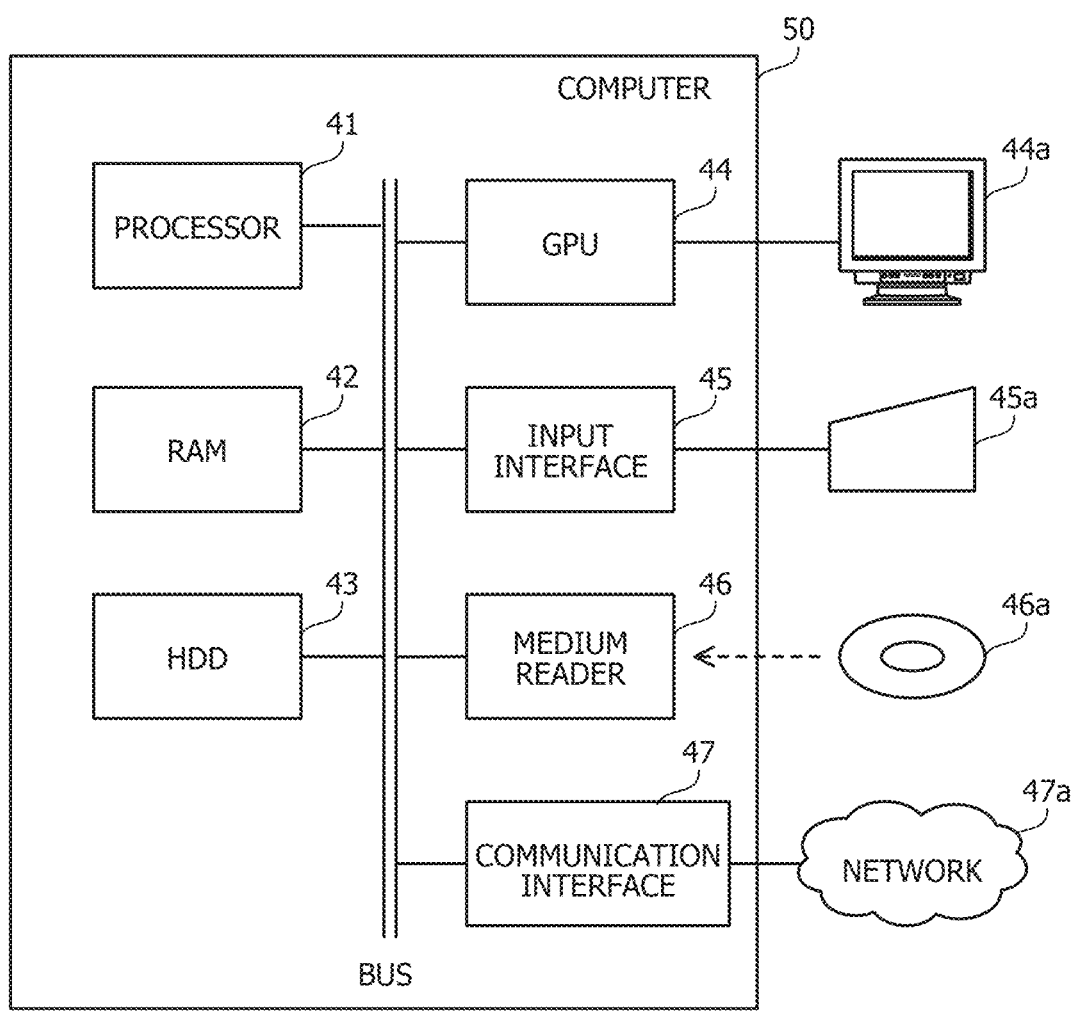
FIG. 21 is a diagram illustrating a hardware example of a computer.

FIG. 21 is a diagram illustrating a hardware example of a computer. The same elements as the elements illustrated in FIG. 20 are given the same reference signs.

A computer 50 is not provided with the accelerator card 48 illustrated in FIG. 20.

In the computer 50, a processor 41 executes the above-described processing details (such as FIGS. 6 to 9, 16, and 17, for example) by executing a program. The processor 41 may include a plurality of processor cores in order to execute processes for a plurality of replicas in parallel. In addition, the HDD 43 can be used as the weighting factor memory 11 illustrated in FIG. 3 and the like, and the RAM 42 can be used as the memory 12.

While one form of the data processing devices, the data processing programs, and the data processing methods according to the embodiments has been described based on the embodiments, this is merely an example and is not limited to the above description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing device comprising:
    a memory configured to store a plurality of values at a first time point, the plurality of values including: values of a plurality of state variables at the first time point, the plurality of state variables being included in an evaluation function of a combinatorial optimization problem with a constraint condition; values of first local fields at the first time point, the first local fields being used to specify a change amount of values of the evaluation function associated with a change in each of the values of the plurality of state variables; and values of second local fields at the first time point, the second local fields being used to specify a constraint violation amount to be added to the values of the evaluation function when the constraint condition is not satisfied;
    a transition candidate designation circuit configured to calculate the change amount by using the values of the first local fields at the first time point, and designate candidates of which the values are to be changed, one by one from among the plurality of state variables, based on the change amount;
    an update circuit configured to update the values of the candidates and the values of the first local fields and the second local fields every time the candidates are designated, and further update, at a second time point, the values of the first local fields by using the values at the first time point and the values at the second time point of the second local fields;
    a cumulative value calculation circuit configured to calculate cumulative values of the change amount when the values of the candidates are changed;
    a determination circuit configured to determine whether or not to accept the change in the values of a first number of the candidates, which is equal to or greater than two, based on the cumulative values; and
    a control circuit configured to return each of the values of the plurality of state variables, the values of the first local fields, and the values of the second local fields to the plurality of values at the first time point when the determination circuit has determined not to accept the change in the values of the first number of the candidates.

2. The data processing device according to claim 1, wherein
    the control circuit switches whether to cause the transition candidate designation circuit to perform a first process in which whether or not to permit the change in each of the values of the plurality of state variables is determined based on the change amount, or a second process in which the candidates are designated one by one, and
    the first time point is a time point when the second process starts.

3. The data processing device according to claim 1, wherein the second time point is a time point when the candidates are designated a plurality of times.

4. The data processing device according to claim 1, wherein
    the memory stores the values of the plurality of state variables and the values of the first local fields and the second local fields by an amount equal to a number of a plurality of replicas, and
    the control circuit causes the transition candidate designation circuit, the update circuit, the cumulative value calculation circuit, and the determination circuit to perform a pipeline process for the plurality of replicas.

5. The data processing device according to claim 1, wherein
    the transition candidate designation circuit includes a plurality of modules, and the plurality of modules designates the first number of the candidates one by one within ranges of mutually different state variable groups among the plurality of state variables, the update circuit updates the values of the state variable groups, the values of the first local fields and the second local fields that correspond to each of the plurality of modules in accordance with the candidates designated by each of the plurality of modules, the cumulative value calculation circuit calculates the cumulative values for each of the plurality of modules, and selects one of the cumulative values calculated for each of the plurality of modules, and the determination circuit determines, based on the selected one of the cumulative values, whether or not to accept the change in the values of the first number of the candidates that correspond to the selected one of the cumulative values.

6. A non-transitory computer-readable recording medium storing a data processing program for causing processor circuitry of a data processing device to execute processing comprising:

storing, in a memory of the computer, a plurality of values including: values of a plurality of state variables at a first time point, the plurality of state variables being included in an evaluation function of a combinatorial optimization problem with a constraint condition; values of first local fields at the first time point, the first local fields being used to specify a change amount of values of the evaluation function associated with a change in each of the values of the plurality of state variables; and values of second local fields at the first time point, the second local fields being used to specify a constraint violation amount to be added to the values of the evaluation function when the constraint condition is not satisfied;

calculating the change amount by using the values of the first local fields at the first time point, and designating candidates of which the values are to be changed, one by one from among the plurality of state variables, based on the change amount;

updating the values of the candidates and the values of the first local fields and the second local fields every time the candidates are designated, and further updating, at a second time point, the values of the first local fields by using the values at the first time point and the values at the second time point of the second local fields;

calculating cumulative values of the change amount when the values of the candidates are changed;

determining whether or not to accept the change in the values of a first number of the candidates, which is equal to or greater than two, based on the cumulative values; and returning each of the values of the plurality of state variables, the values of the first local fields, and the values of the second local fields to the plurality of values at the first time point when the determining has determined not to accept the change in the values of the first number of the candidates.

7. A data processing method implemented by processor circuitry of a data processing device, the data processing method comprising:

storing, in a memory of the computer, a plurality of values including: values of a plurality of state variables at a first time point, the plurality of state variables being included in an evaluation function of a combinatorial optimization problem with a constraint condition; values of first local fields at the first time point, the first local fields being used to specify a change amount of values of the evaluation function associated with a change in each of the values of the plurality of state variables; and values of second local fields at the first time point, the second local fields being used to specify a constraint violation amount to be added to the values of the evaluation function when the constraint condition is not satisfied;

calculating the change amount by using the values of the first local fields at the first time point, and designating candidates of which the values are to be changed, one by one from among the plurality of state variables, based on the change amount;

updating the values of the candidates and the values of the first local fields and the second local fields every time the candidates are designated, and further updating, at a second time point, the values of the first local fields by using the values at the first time point and the values at the second time point of the second local fields;

calculating cumulative values of the change amount when the values of the candidates are changed;

determining whether or not to accept the change in the values of a first number of the candidates, which is equal to or greater than two, based on the cumulative values; and returning each of the values of the plurality of state variables, the values of the first local fields, and the values of the second local fields to the plurality of values at the first time point when the determining has determined not to accept the change in the values of the first number of the candidates.

* * * * *